US011762536B2

(12) United States Patent
Hofman et al.

(10) Patent No.: US 11,762,536 B2
(45) Date of Patent: *Sep. 19, 2023

(54) VALIDATING RELATIONSHIPS BETWEEN CLASSES IN OBJECT MODELS

(71) Applicant: Tableau Software, LLC, Seattle, WA (US)

(72) Inventors: Ewald Marcus Hofman, Marysville, WA (US); Allison Chia-Chun Sun, Los Altos, CA (US)

(73) Assignee: Tableau Software, LLC, Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/076,355

(22) Filed: Dec. 6, 2022

(65) Prior Publication Data
US 2023/0123086 A1 Apr. 20, 2023

Related U.S. Application Data

(63) Continuation of application No. 17/397,913, filed on Aug. 9, 2021, now Pat. No. 11,520,463.

(51) Int. Cl.
*G06F 3/0482* (2013.01)
*G06T 11/20* (2006.01)
(Continued)

(52) U.S. Cl.
CPC ........ *G06F 3/0482* (2013.01); *G06F 3/04817* (2013.01); *G06F 16/288* (2019.01);
(Continued)

(58) Field of Classification Search
CPC .. G06F 3/0482; G06F 3/04817; G06F 16/289; G06F 16/288; G06T 11/001; G06T 11/206
See application file for complete search history.

(56) References Cited

U.S. PATENT DOCUMENTS

| 5,499,359 A | 3/1996 | Vijaykumar |
| 8,365,138 B2 * | 1/2013 | Iborra ................. G06F 16/2365 717/113 |

(Continued)

OTHER PUBLICATIONS

Hofman, Notice of Allowance, U.S. Appl. No. 17/397,913, dated Aug. 4, 2022, 11 pgs.

*Primary Examiner* — Seth A Silverman
(74) *Attorney, Agent, or Firm* — Morgan, Lewis & Bockius LLP

(57) ABSTRACT

A computer validates relationships between object classes in object models. The computer detects user input to join a first object class and a second object class corresponding to user-selected object icons. The computer also detects user selection of a first linking field from a plurality of data fields for the first object class and user selection of a second linking field from a plurality of data fields for the second object class. In response, the computer generates a relationship that connects the first object class and the second object class according to shared data values of the first linking field and the second linking field and displays a relationship summary, including information regarding cardinality of the relationship and information regarding referential integrity of the relationship. The computer also displays a visual connection between the user-selected object icons representing the first and second object classes.

20 Claims, 21 Drawing Sheets

(51) Int. Cl.
*G06F 3/04817* (2022.01)
*G06F 16/28* (2019.01)
*G06T 11/00* (2006.01)

(52) U.S. Cl.
CPC .......... *G06F 16/289* (2019.01); *G06T 11/001* (2013.01); *G06T 11/206* (2013.01); *G06T 2200/24* (2013.01)

(56) References Cited

U.S. PATENT DOCUMENTS

| | | | |
|---|---|---|---|
| 10,861,203 B1 * | 12/2020 | Cervelli | ................ G06T 11/206 |
| 2004/0090472 A1 * | 5/2004 | Risch | ...................... G06F 16/34 |
| | | | 707/E17.093 |

* cited by examiner

VALIDATING RELATIONSHIPS BETWEEN CLASSES IN OBJECT MODELS

RELATED APPLICATIONS

This application is a continuation of U.S. patent application Ser. No. 17/397,913, filed Aug. 9, 2021, entitled "Validating Relationships Between Classes in Object Models," which is incorporated by reference herein in its entirety.

This application is related to U.S. patent application Ser. No. 16/236,611, filed Dec. 30, 2018, entitled "Generating Data Visualizations According to an Object Model of Selected Data Sources," which is incorporated by reference herein in its entirety.

This application is related to U.S. patent application Ser. No. 16/570,969, filed Sep. 13, 2019, entitled "Utilizing Appropriate Measure Aggregation for Generating Data Visualizations of Multi-Fact Datasets," which is incorporated by reference herein in its entirety.

This application is related to U.S. patent application Ser. No. 16/572,506, filed Sep. 16, 2019, entitled "Systems and Methods for Visually Building an Object Model of Database Tables," which is incorporated by reference herein in its entirety.

This application is related to U.S. patent application Ser. No. 16/679,111, filed Nov. 8, 2019, entitled "Using Visual Cues to Validate Object Models of Database Tables," which is incorporated by reference herein in its entirety.

This application is related to U.S. patent application Ser. No. 16/679,233, filed Nov. 10, 2019, entitled "Systems and Methods for Visualizing Object Models of Database Tables," which is incorporated by reference herein in its entirety.

This application is related to U.S. patent application Ser. No. 17/307,427, filed May 4, 2021, entitled "Systems and Methods for Visualizing Object Models of Database Tables," which is incorporated by reference herein in its entirety.

TECHNICAL FIELD

The disclosed implementations relate generally to data visualization and more specifically to systems and methods that facilitate building object models and validating relationships between objects in object models of a data source.

BACKGROUND

Data visualization applications enable a user to understand a data set visually, including distribution, trends, outliers, and other factors that are important to making business decisions. Some data visualization applications provide a user interface that enables users to build visualizations from a data source by selecting data fields and placing them into specific user interface regions to indirectly define a data visualization. However, when there are complex data sources and/or multiple data sources, it may be unclear what type of data visualization to generate (if any) based on a user's selections.

SUMMARY

In some cases, it can help to construct an object model of a data source before generating data visualizations. In some instances, a person creates an object model of a data source that can be shared with and used by others. By storing the relationships between data tables in an object model, a data visualization application can leverage that information to assist all users who access the data, regardless of their expertise in or familiarity with the data source. For example, other users can combine tables or augment an existing table or an object model.

Regardless of the level of familiarity with or expertise in the data source, it is desirable to provide a user-friendly interface for generating the object model. It is also desirable to help users validate the relationships defined in the object model. In some cases, it may not be obvious to a user how two data tables should be connected in an object model. A user interface provides information regarding the relationship between two data tables, functional features to help a user identify correct linking fields for connecting the data tables, and helpful features for troubleshooting when the selected linking fields lead to unexpected or undesirable results.

An object is a collection of named attributes. An object often corresponds to a real-world object, event, or concept, such as a Store. The attributes are descriptions of the object that are conceptually at a 1:1 relationship with the object. Thus, a Store object may have a single [Manager Name] or [Employee Count] associated with it. At a physical level, an object is often stored as a row in a relational table, or as an object in JSON. An object may directly correspond to a single row from a single data table from a data source, or may be formed by joining or combining two or more data tables (from one or more data sources) together.

A class (or an "object class") is a collection of objects that share the same attributes. It must be analytically meaningful to compare objects within a class and to aggregate over them. At a physical level, a class is often stored as a relational table, or as an array of objects in JSON.

An object model is a set of classes and a set of many-to-one relationships between the classes. Classes that are related by 1-to-1 relationships are conceptually treated as a single class, even if they are meaningfully distinct to a user. In addition, classes that are related by 1-to-1 relationships may be presented as distinct classes in the data visualization user interface. Many-to-many relationships are conceptually split into two many-to-one relationships by adding an associative table capturing the relationship.

Once an object model is constructed, a data visualization application can assist a user in various ways. In some implementations, based on data fields already selected and placed onto shelves in the user interface, the data visualization application can recommend additional fields or limit what actions can be taken to prevent unusable combinations. In some implementations, the data visualization application allows a user considerable freedom in selecting fields, and uses the object model to build one or more data visualizations according to what the user has selected.

Defining appropriate relationships between classes in an object model is crucial in creating an object model of a database that can easily be interpreted and used for data analysis. Thus, proper validation of relationships between classes in an object model is vital to the accessibility and comprehension of the object model. The methods describe herein provide an interface for users to easily define how classes in an object model are related to one another, see diagnostic information regarding the defined relationships to understand the consequences of the defined relationships, and make any necessary changes or validate the defined relationship.

In accordance with some implementations, a method of validating relationships between object classes in object models is performed at a computer having one or more processors, a display, and memory. The memory stores one or more programs configured for execution by the one or more processors. The computer concurrently displays, in a user interface: (i) a connections region including one or more user-selectable data sources, (ii) an object model visualization region including a plurality of object model icons, and (iii) a data field region including the data fields for one or more selected object icons in the object model visualization region. Each object model icon represents a respective object class having a respective plurality of data fields. The computer detects user input to join a first object class and a second object class whose corresponding object icons are selected in the object model visualization region and user selection of a first linking field from the plurality of data fields for the first object class and user selection of a second linking field from the plurality of data fields for the second object class. In response to receiving the user selection of the first linking field and the second linking field, the computer: (a) generates a relationship that connects the first object class and the second object class according to shared data values of the first linking field and the second linking field, (b) displays a relationship summary in the data field region, and (c) updates the object model visualization region to display a visual connection between the object icons representing the first and second object classes. The relationship summary includes information regarding cardinality of the relationship and information regarding referential integrity of the relationship.

In some implementations, the computer determines that the first linking field is related to the second linking field via a many-to-many relationship. In response to the determination that the first linking field is related to the second linking field via a many-to-many relationship, the computer displays the relationship summary, including displaying a warning that a many-to-many relationship is detected.

In some implementations, in response to the determination that the first linking field is related to the second linking field via a many-to-many relationship, the relationship summary includes an affordance for user selection to designate the detected many-to-many relationship as valid. When a user selects the affordance, the computer designates the many-to-many relationship as valid.

In some implementations, based on matching between (i) data values of the first linking field in the first object class and (ii) data values of the second linking field in the second object class, the relationship summary indicates: (a) the number of matched rows from the first object class, (b) the number of unmatched rows from the first object class, (c) the number of matched rows from the second object class, and (d) the number of unmatched rows from the second object class.

In some implementations, the information regarding referential integrity of the relationship includes a data visualization that illustrates the numbers of matched and unmatched rows for each of the first and second object classes.

In some implementations, the data visualization includes a first visual mark corresponding to one of: (a) the number of matched rows from the first object class, (b) the number of unmatched rows from the first object class, (c) the number of matched rows from the second object class, and (d) the number of unmatched rows from the second object class. In response to detecting a user gesture at the first visual mark, the computer displays information regarding a number of rows represented by the first visual mark and information regarding whether the rows represented by the first visual mark are matched or unmatched.

In some implementations, the computer displays a data region in the user interface. The data region includes data values for one or more data fields of a selected object class in the object model visualization region. The computer also displays, in the data region: (i) a first affordance configured to, when selected, cause display of data values from the first object class in the data region, (ii) a second affordance configured to, when selected, cause display of data values from the second object class in the data region, and (iii) a third affordance configured to, when selected, cause display of information regarding data values of the first linking field and data values of the second linking field in the data region.

In some implementations, the computer also displays, in the data region, a fourth affordance configured to cause the data region to display rows of the first object class and rows of the second object class that are matched to each other without displaying rows of the first object class or rows of the second object class that are unmatched.

In some implementations, the computer displays, in the user interface, a tables region that includes one or more data tables in a selected data source from the connections region. Detecting the user input to join the first object class and the second object class includes detecting a first user input that places a first table from the tables region into the object model visualization region to form the first object class and detecting a second user input that places a second table from the tables region into the object model visualization region to form the second object class. In response to detecting the first user input, the computer displays a first object icon representing the first object class in the object model visualization region. In response to detecting the second user input, the computer displays a second object icon representing the second object class in the object model visualization region In some implementations, the object icons are color coded so that the first object icon is displayed with a first color that is associated with the first object class and the second object icon is displayed with a second color that is associated with the second object class. The second color is distinct from the first color.

In accordance with some implementations, a non-transitory computer readable storage medium stores one or more programs configured for execution by a computer system having one or more processors and memory. The one or more programs include instructions for performing any of the methods described herein.

Thus, methods, systems, and graphical user interfaces are provided for validating relationships between object classes in object models.

BRIEF DESCRIPTION OF THE DRAWINGS

For a better understanding of the aforementioned implementations of the invention as well as additional implementations, reference should be made to the Description of Implementations below, in conjunction with the following drawings in which like reference numerals refer to corresponding parts throughout the figures.

Like reference numerals refer to corresponding parts throughout the drawings.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
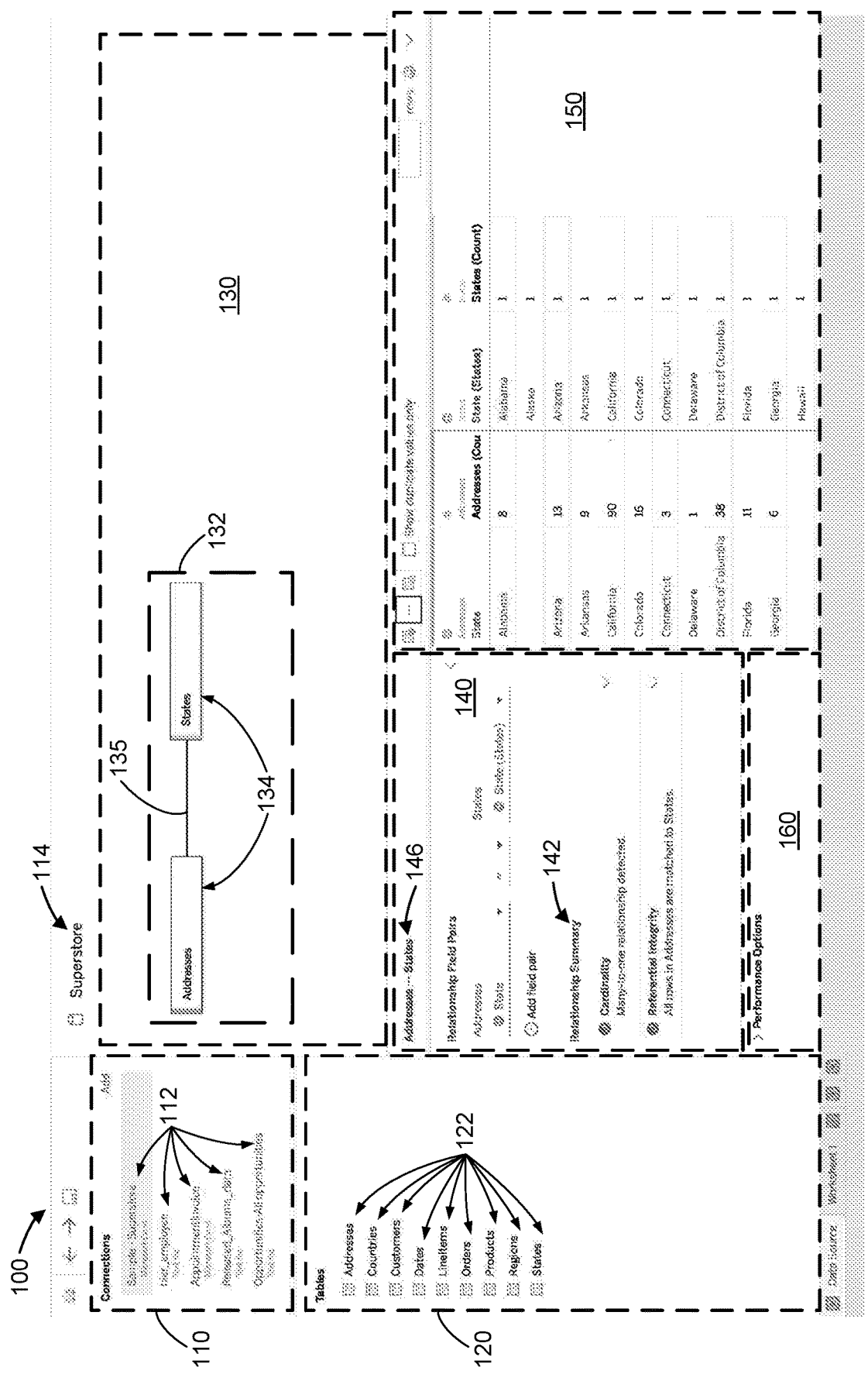
FIG. 1 illustrates a user interface for building object models in accordance with some implementations.

FIG. 1 illustrates a graphical user interface 100 for building an object model and validating relationships between classes (also referred to as object classes) in the object model. The user interface 100 includes a connections region 110, a tables region 120, an object model visualization region 130, a data field region 140, a data region 150, and a performance option region 160 in accordance with some example implementations. The connections region 110 includes one or more user-selectable data sources 112. The tables region 120 includes one or more data tables 122 from a data source 112 that is selected in the connections region 110. The object model visualization region 130 includes an object model 132 that includes a plurality of object model icons 134. Each object model icon 134 represents a respective object class in the object model 132, and each object class includes a respective plurality of data fields. The object model visualization region also displays a visual connection 135 between connected object icons 134 representing the relationship between the connected object icons 134. The data field region 140 includes information regarding the data fields for one or more object classes that are represented in the object model visualization region 130 as object icons 134. In some implementations, such as when a relationship between two classes or a user intent to define a relationship between two classes in the object model 132 is detected, the data field region 140 displays a relationship summary 142, which includes information regarding the cardinality of the relationship (e.g., the detected relationship or the selected relationship (in the case where more than one relationship exists)) and information regarding the referential integrity of the relationship. The data region 150 includes information regarding data fields corresponding to one or more object classes that are represented in the object model visualization region 130 as object icons 134.

Figure 2A:
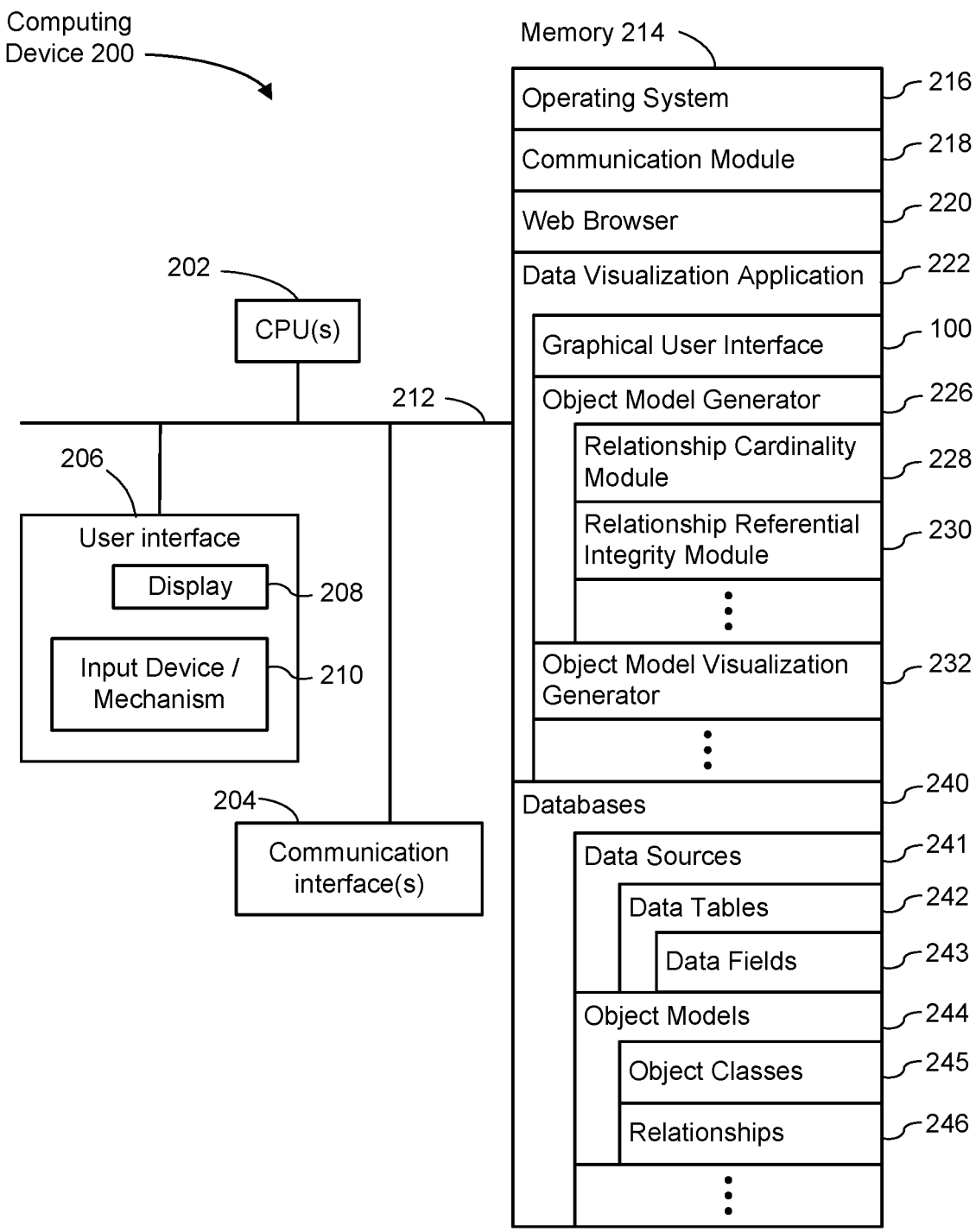
FIG. 2A is a block diagram of a computing device according to some implementations.

FIG. 2A is a block diagram of a computing device 200 (e.g., a client device) that can execute a data visualization application 222 or a data visualization web application to display a data visualization. In some implementations, the computing device displays a graphical user interface 100 for the data visualization application 222. The computing device 200 may be a desktop computer, a laptop computer, a tablet computer, or other computing device with a display and a processor capable of running a data visualization application 222. The data visualization application 222 may include a data source generator for database organization (e.g., generating object models for databases) as well as generating new data sources using existing databases. A computing device 200 typically includes one or more processing units/cores (CPUs) 202 for executing modules, programs, and/or instructions stored in the memory 214 and thereby performing processing operations, one or more network or other communications interfaces 204, memory 214, and one or more communication buses 212 for interconnecting these components. The communication buses 212 may include circuitry that interconnects and controls communications between system components. A computing device 200 includes a user interface 206 comprising a display 208 and one or more input devices or mechanisms 210. In some implementations, the input device/mechanism includes a keyboard; in some implementations, the input device/mechanism includes a "soft" keyboard, which is displayed as needed on the display 208, enabling a user to "press keys" that appear on the display 208. In some implementations, the display 208 and input device/mechanism 210 comprise a touch screen display (also called a touch sensitive display). In some implementations, the display is an integrated part of the computing device 200. In some implementations, the display is a separate display device.

In some implementations, the memory 214 includes high-speed random-access memory, such as DRAM, SRAM, DDR RAM or other random-access solid-state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPUs 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other client application), which enables a user to communicate over a network with remote computers or devices;
- a data visualization application 222, which provides a graphical user interface 100 for a user to perform data analysis, including constructing databases, constructing object models, and constructing visual graphics (e.g., an individual data visualization or a dashboard with a plurality of related data visualizations). In some implementations, the data visualization application 222 executes as a standalone application (e.g., a desktop application). In some implementations, the data visualization application 222 executes within the web browser 220 (e.g., as a web application). The data visualization application 222 includes:
  - a graphical user interface 100, which enables a user to access or build object models and data sources, and also provides a graphical view to build data visualizations by specifying elements visually;
- an object model generator 226 for generating object models that include a plurality of object classes. The object model can be generated from one or more databases, and each object class in the object model can be generated from one or more data tables or one or more data fields. An object icon represents a logical combination of one or more data tables. For example, an object class that is represented by an object icon may include one or more data fields from a data table. In another example, an object class that is represented by an object icon may be constructed by combining (e.g., a left join, a right join, an inner join, a union, or an intersection) two data tables to one another. The object model generator 226 includes a relationship cardinality module 228, which determines the cardinality of a relationships between two object classes. For example, the relationship cardinality module 228 may determine that a manty-to-one relationship has been detected or that a many-to-many relationship has been detected. The object model generator 226 also includes a relationship referential integrity module 230, which analyzes and compares data values in linking fields (e.g., linking data fields) from two object classes that are joined in a relationship to identify matched data values and unmatched data values; and an object model visualization generator 232, which generates (e.g., constructs) a visualization of an object model 132 for display in the object model visualization region 130. The object model visualization generator 232 generates object icons 134 corresponding to object classes in the object model 132, and generates visual representations of relationships between two object classes in the object model 132. For example, as shown in FIG. 1, the object model visualization generator 232 has generated a view of an object model 132, which includes two object icons 134 connected by a solid line; and one or more databases 240, which may store one or more data sources 241 and/or one or more object models 244. Each data source 241 includes one or more data tables 242, and each of the data tables includes one or more data fields 243. Each object model 244 includes a plurality of object classes 245 that are connected to one another by relationship(s) 246.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. In some implementations, the memory 214 stores additional modules or data structures not described above.

Although FIG. 2A shows a computing device 200, FIG. 2A is intended more as a functional description of the various features that may be present rather than as a structural schematic of the implementations described herein. In practice, and as recognized by those of ordinary skill in the art, items shown separately could be combined and some items could be separated.

Figure 2B:
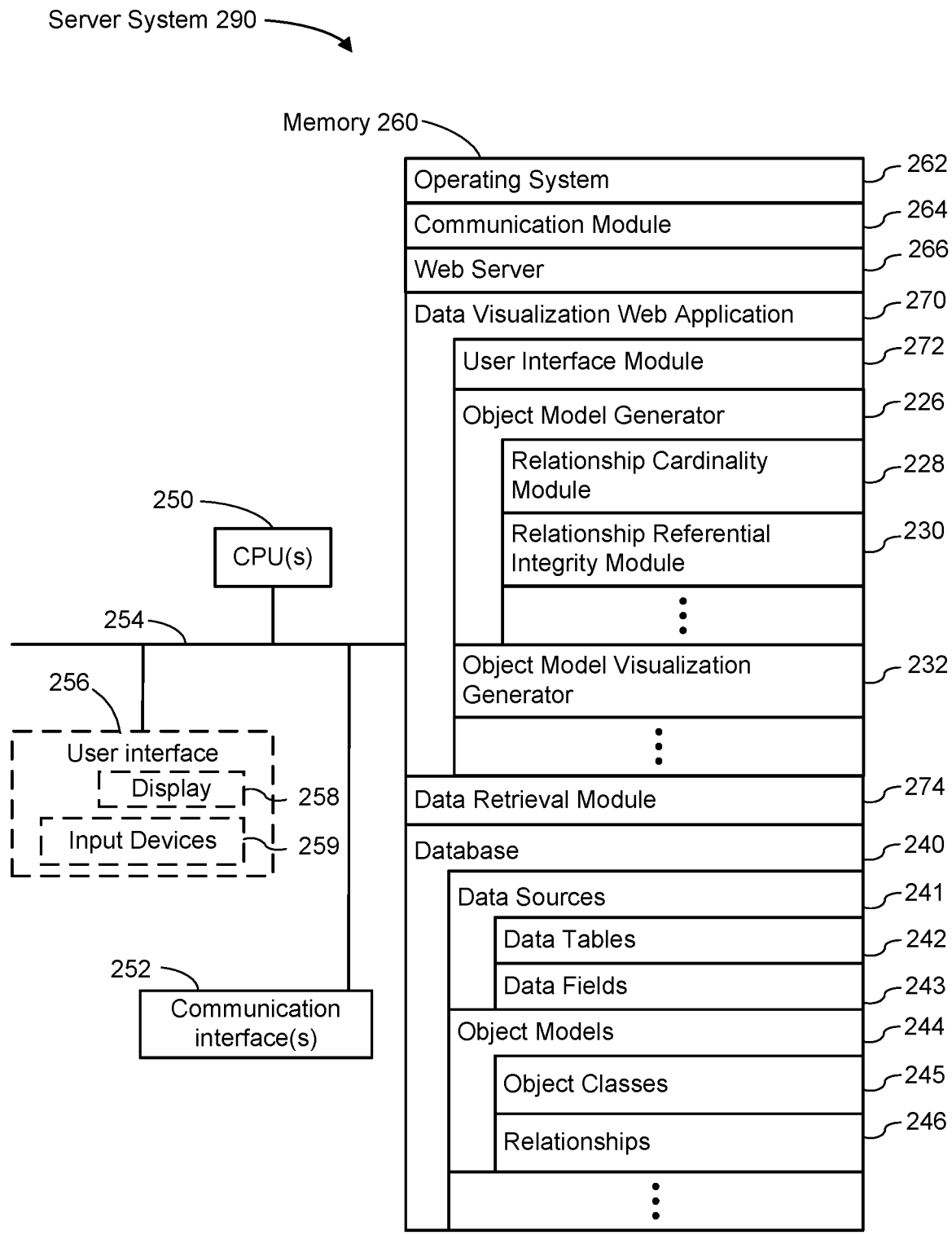
FIG. 2B is a block diagram of a server system according to some implementations.

FIG. 2B is a block diagram of a server system 290 in accordance with some implementations. A server system 290 may host one or more databases 240 or may provide various executable applications or modules. A server 290 typically includes one or more processing units/cores (CPUs) 250, one or more network interfaces 252, memory 260, and one or more communication buses 254 for interconnecting these components. In some implementations, the server 290 includes a user interface 256, which includes a display 258 and one or more input devices 259, such as a keyboard and a mouse. In some implementations, the communication buses 254 include circuitry (sometimes called a chipset) that interconnects and controls communications between system components.

In some implementations, the memory 260 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 260 includes one or more storage devices remotely located from the CPU(s) 250. The memory 260, or alternatively the non-volatile memory devices within the memory 260, comprises a non-transitory computer readable storage medium.

In some implementations, the memory 260, or the computer readable storage medium of the memory 260, stores the following programs, modules, and data structures, or a subset thereof:

an operating system 262, which includes procedures for handling various basic system services and for performing hardware dependent tasks;

a network communication module 264, which is used for connecting the server 290 to other computers via the one or more communication network interfaces 252 (wired or wireless) and one or more communication networks, such as the Internet, other wide area networks, local area networks, metropolitan area networks, and so on;

a web server 266 (such as an HTTP server), which receives web requests from users and responds by providing responsive web pages or other resources;

a data visualization web application 270, which may be downloaded and executed by a web browser 220 on a user's computing device 200. In general, a data visualization web application 270 has the same functionality as a desktop data visualization application 222, but provides the flexibility of access from any device at any location with network connectivity, and does not require installation and maintenance. In some implementations, the data visualization web application 270 includes various software modules to perform certain tasks. In some implementations, the data visualization web application 270 includes a user interface module 272, which provides the user interface for all aspects of the data visualization web application 270. The data visualization web application 270 also includes an object model generator 226 and an object model visualization generator 232, as described above with respect to FIG. 2A. The object model generator 226 includes a relationship cardinality module 228 and a relationship referential integrity module 230, both of which are described above with respect to FIG. 2A;

a data retrieval module 274, which builds and executes queries to retrieve data from one or more databases 240. The databases 240 may be stored locally on the server 290 or stored at an external database system. For example, the data retrieval module 244 may retrieve a database 240 that stores one or more data sources 241 such that data tables 242 and data fields 243 from the data source 241 can be used to build an object model; and one or more databases 240, which store data used or created by the data visualization web application 270 or data visualization application 222. The databases 240 may store data sources 241, which provide the data used in the generated data visualizations. For example, a database 240 may store an object model 244 that includes a plurality of object classes 245 that are linked to one another via one or more relationships 246, and the object classes 245 may be formed from data fields 243 from the one or more data sources 241.

The databases 240 may store data in many different formats, and commonly include many distinct tables 242 (e.g., data tables 242), each with a plurality of data fields 243. Some databases 240 comprise a single table.

The data fields 243 in the database 240 include both raw fields from the database 240 (e.g., a column from a database table or a column from a spreadsheet) as well as derived data fields, which may be computed or constructed from one or more other data fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields 243 are stored separately from the data source 241. In some implementations, the database 240 stores a set of user preferences for each user. The user preferences may be used when the data visualization web application 270 (or desktop data visualization application 222) makes recommendations about how to view a set of data fields 243. In some implementations, the database 240 stores a data visualization history log, which stores information about each data visualization generated.

In some implementations, the database 240 stores other information, including other information used by the data visualization application 222 or data visualization web application 270. The databases 240 may be separate from the server system 290, or may be included with the server system (or both).

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 260 stores a subset of the modules and data structures identified above. In some implementations, the memory 260 stores additional modules or data structures not described above.

Although FIG. 2B shows a server system 290, FIG. 2B is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 290 may be stored or executed on a computing device 200. In some implementations, the functionality and/or data may be allocated between a computing device 200 and one or more servers 290. Furthermore, one of skill in the art recognizes that FIG. 2B need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically collocated (e.g., the individual physical devices could be spread throughout the United States or throughout the world).

Figure 3A:
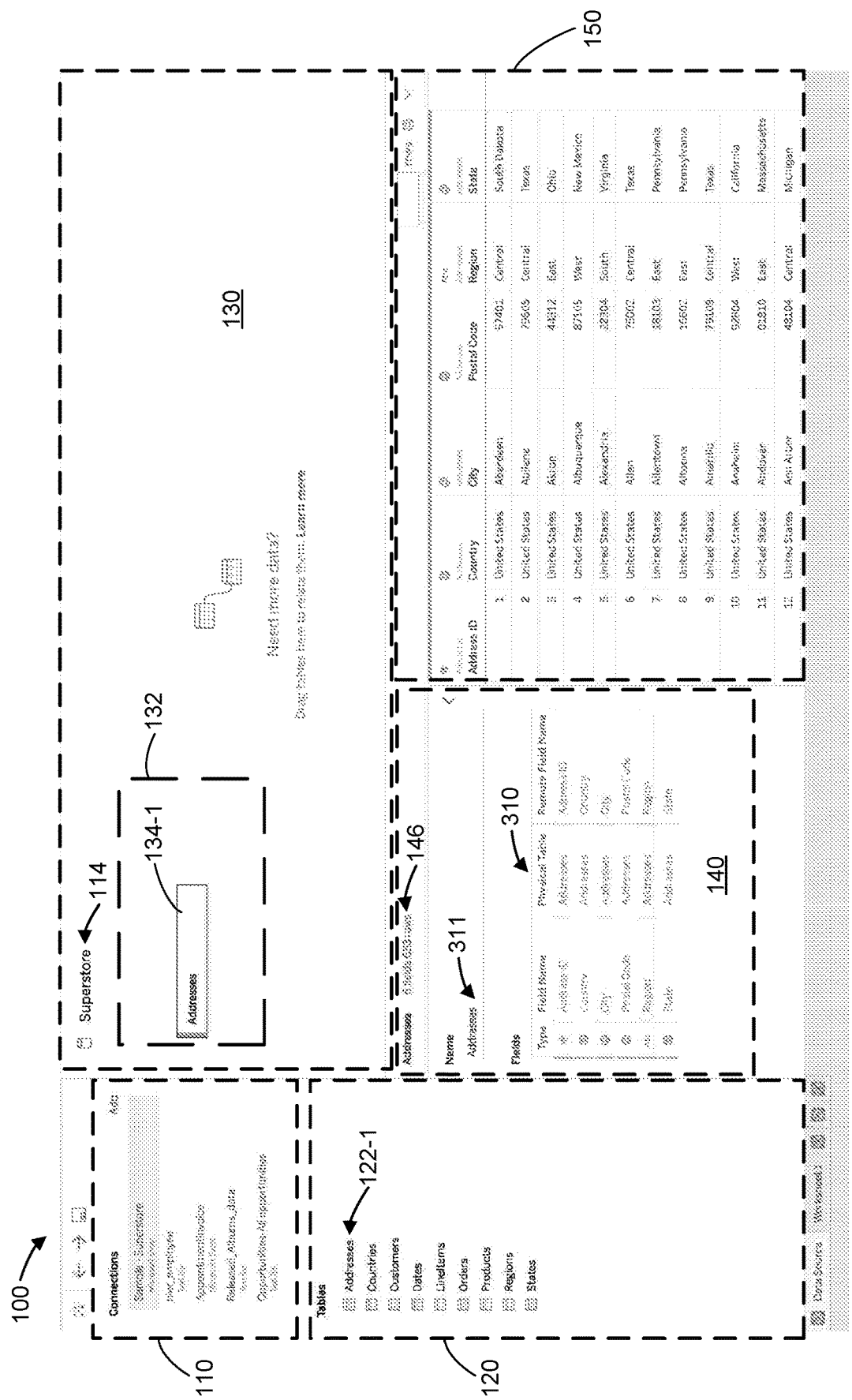
FIGS. 3A-3N are screen shots illustrating various features for building object models according to some disclosed implementations.
Figure 3B:
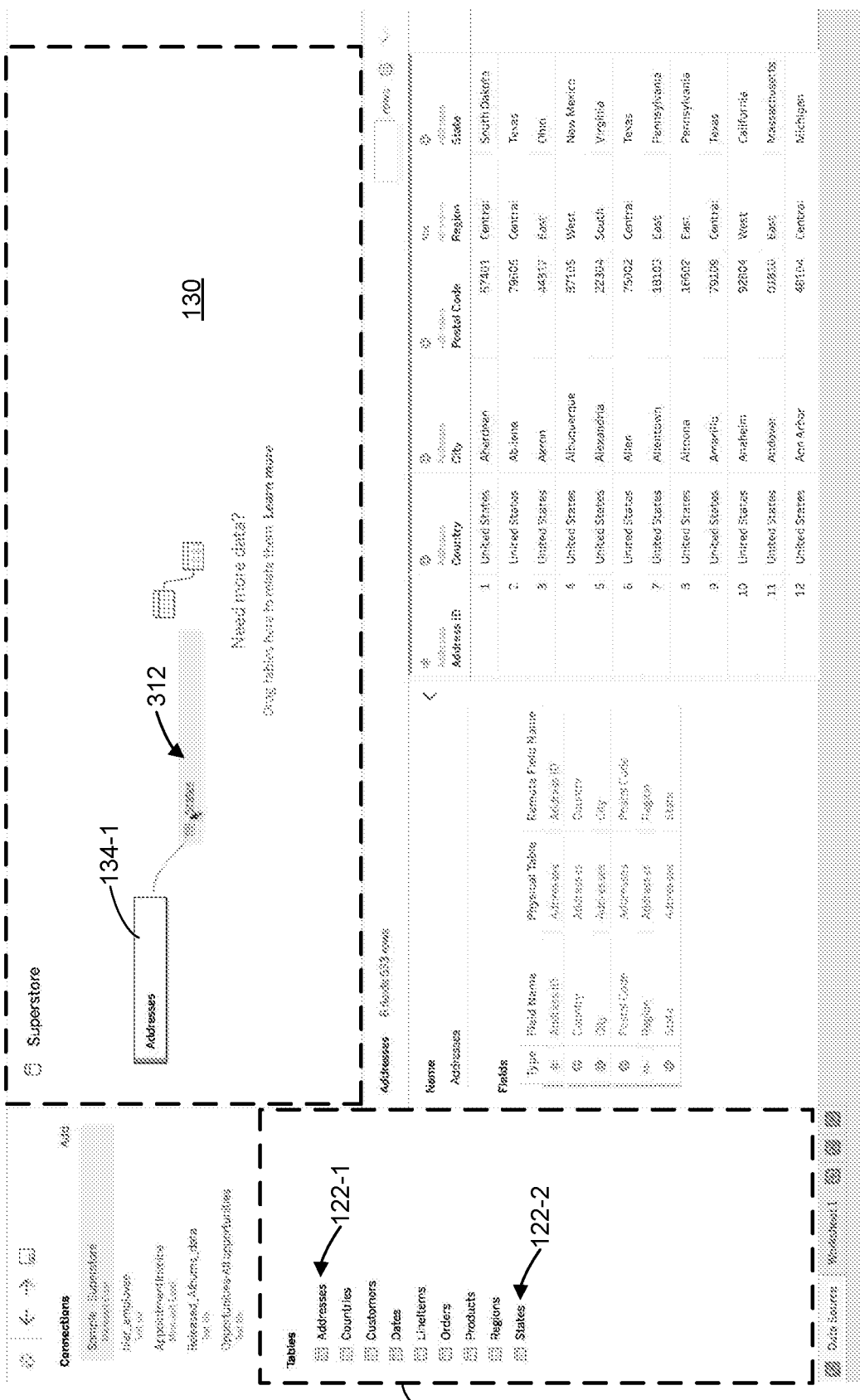
Figure 3C:
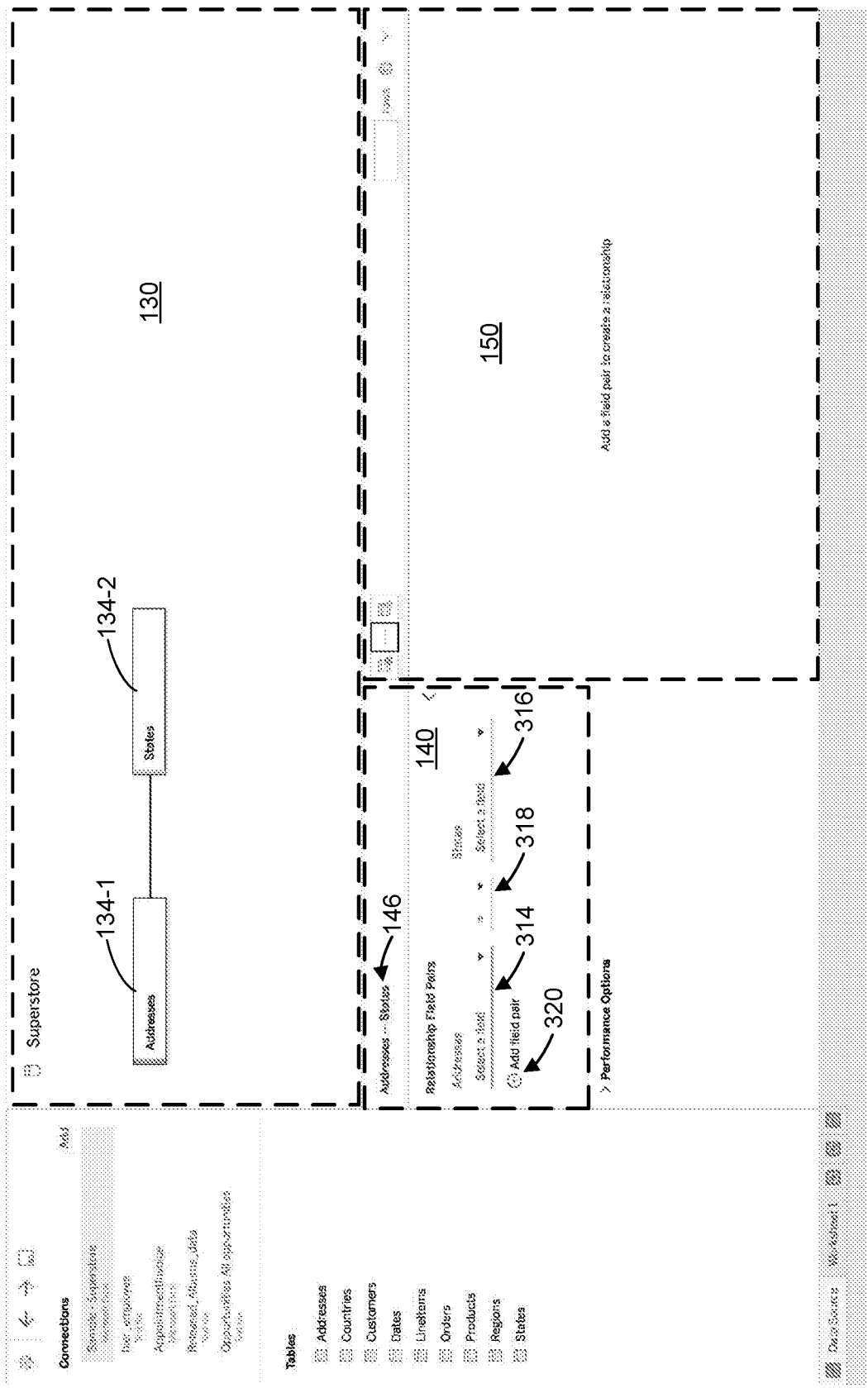
Figure 3D:
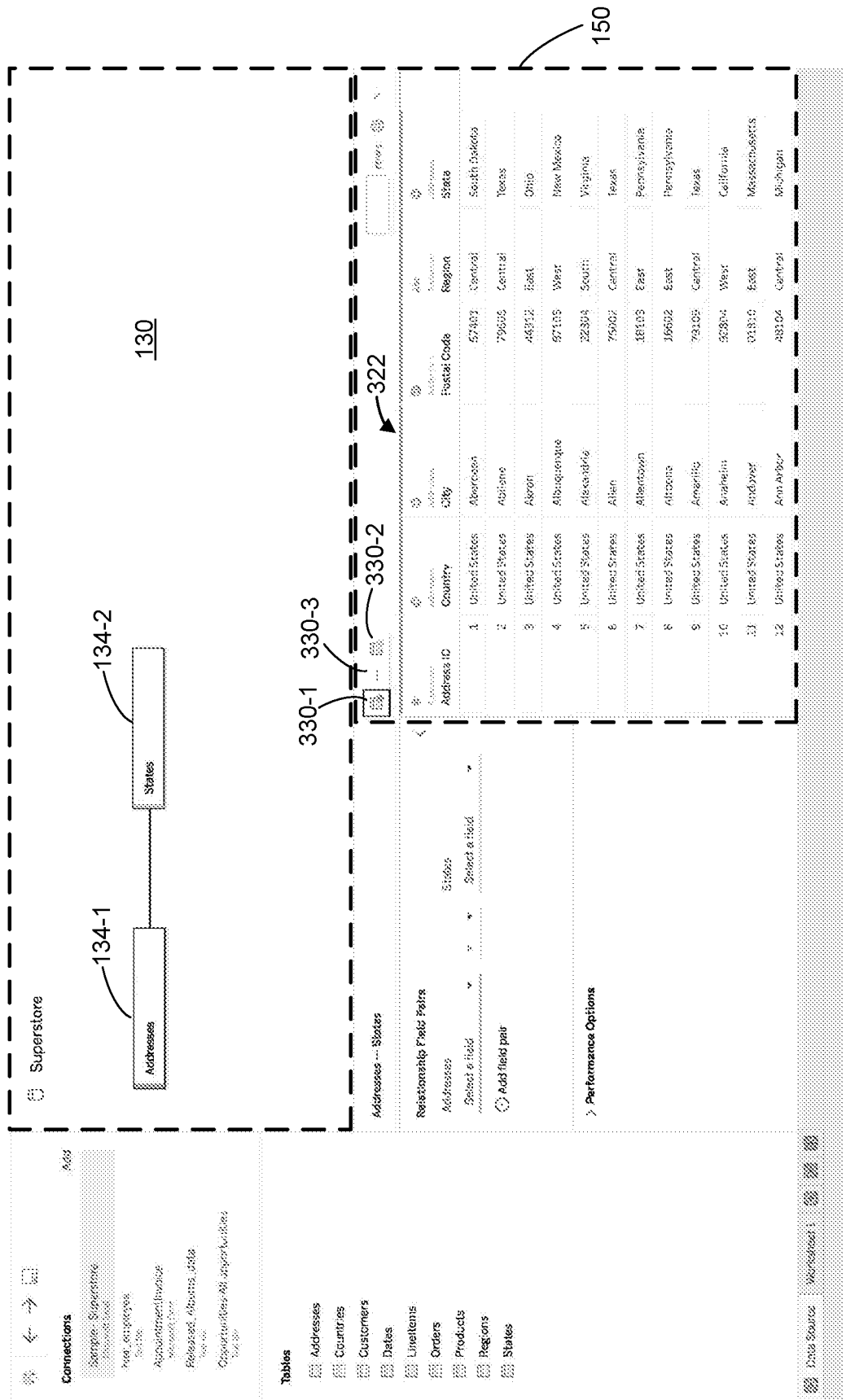
Figure 3E:
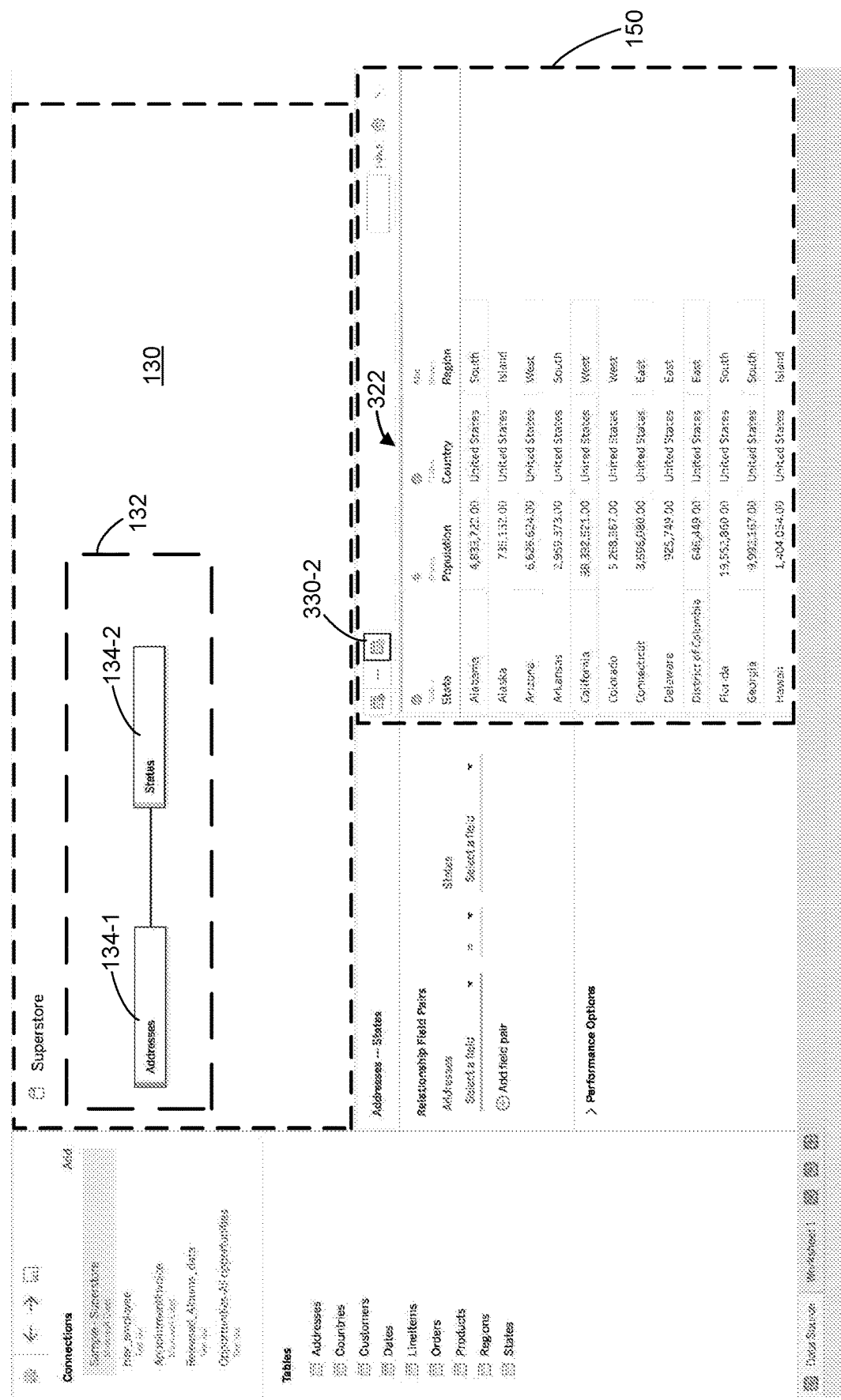
Figure 3F:
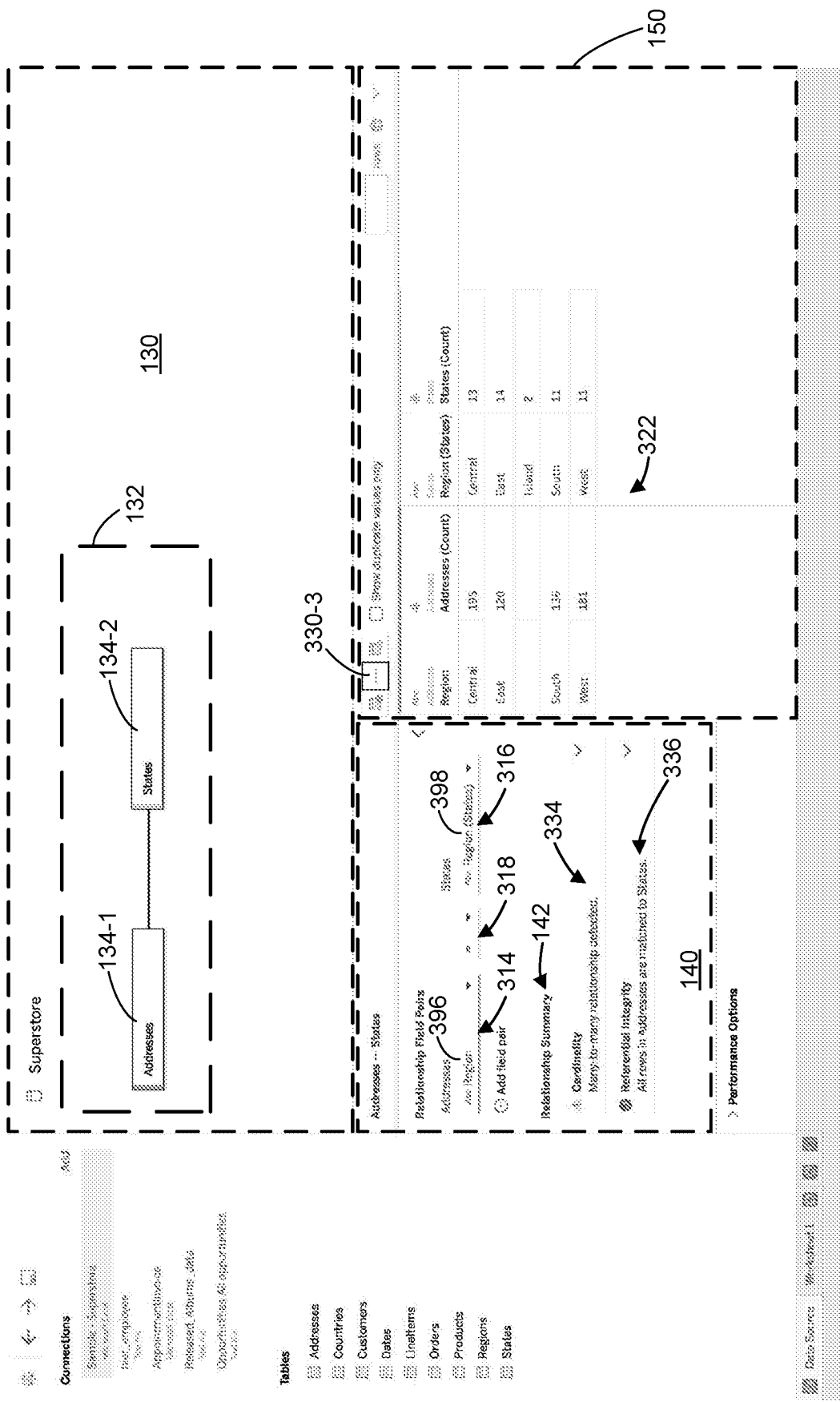
Figure 3G:
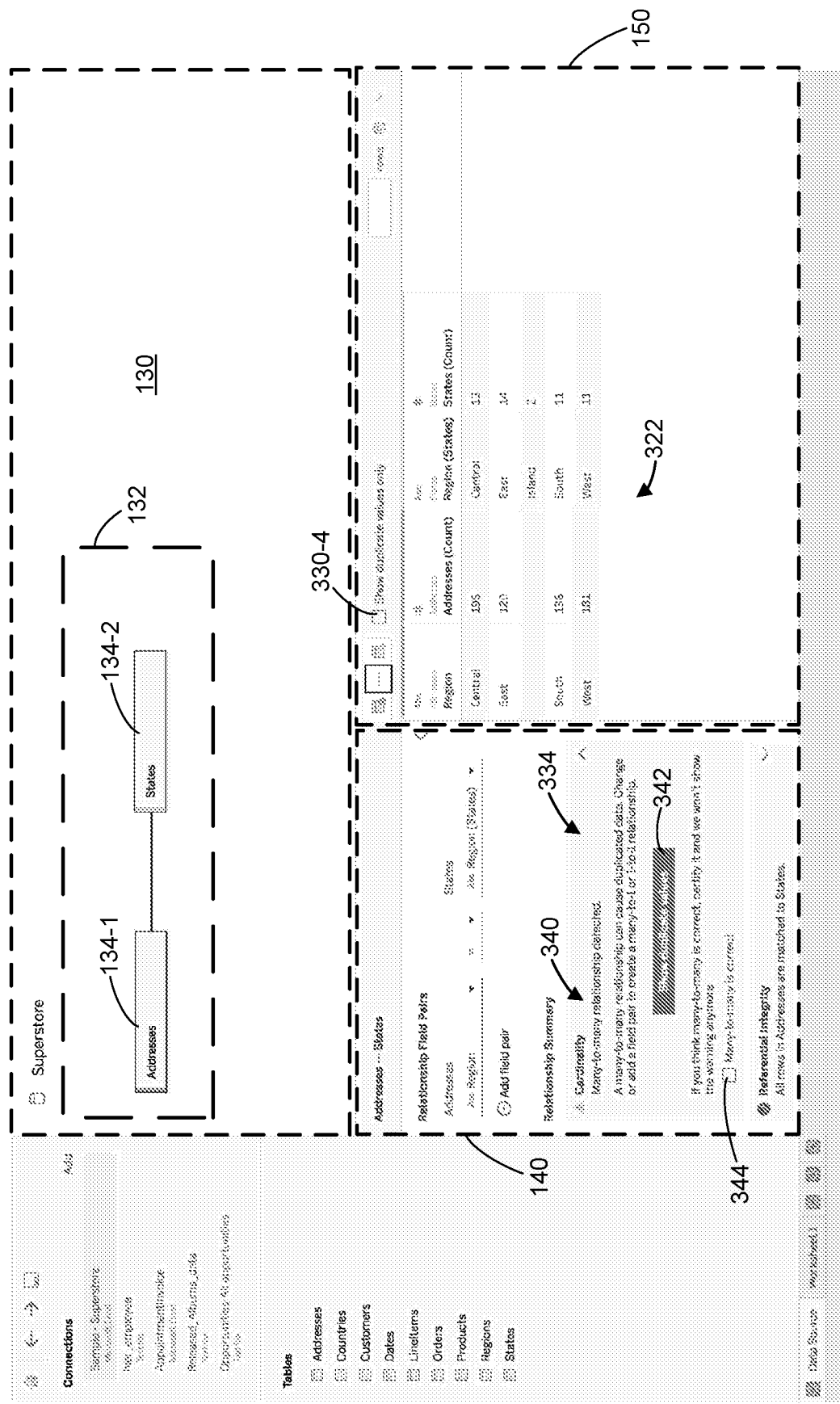
Figure 3H:
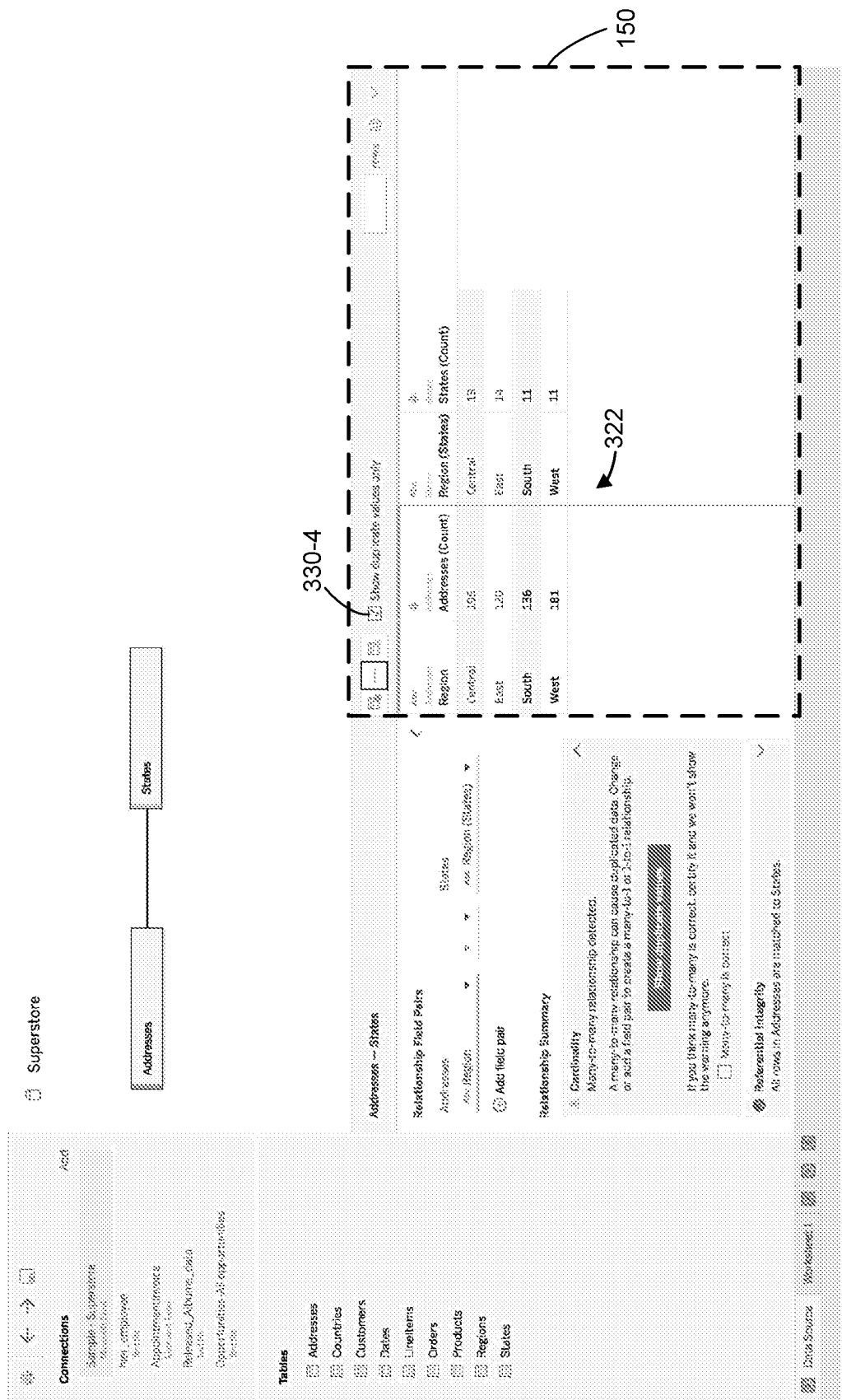
Figure 3I:
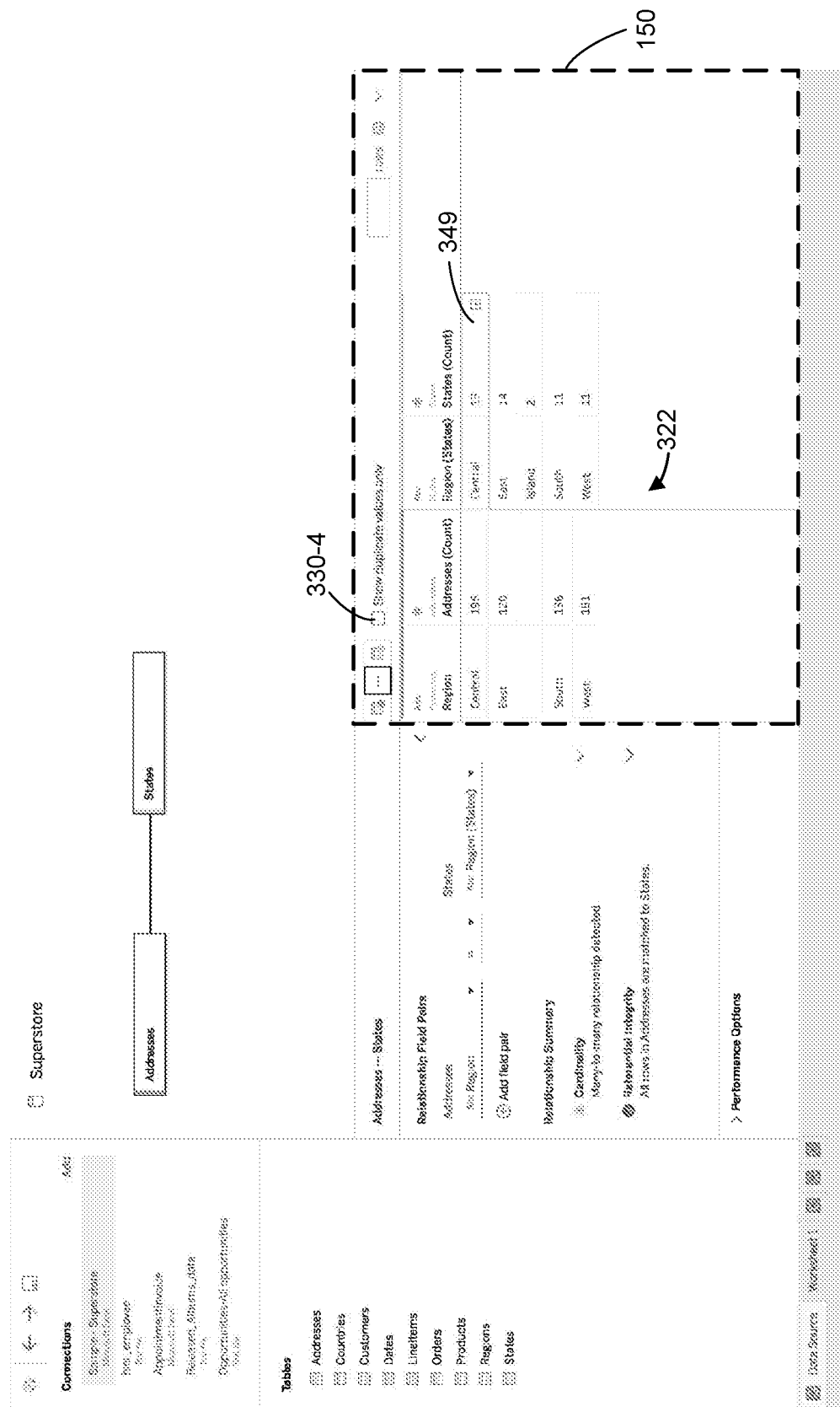
Figure 3J:
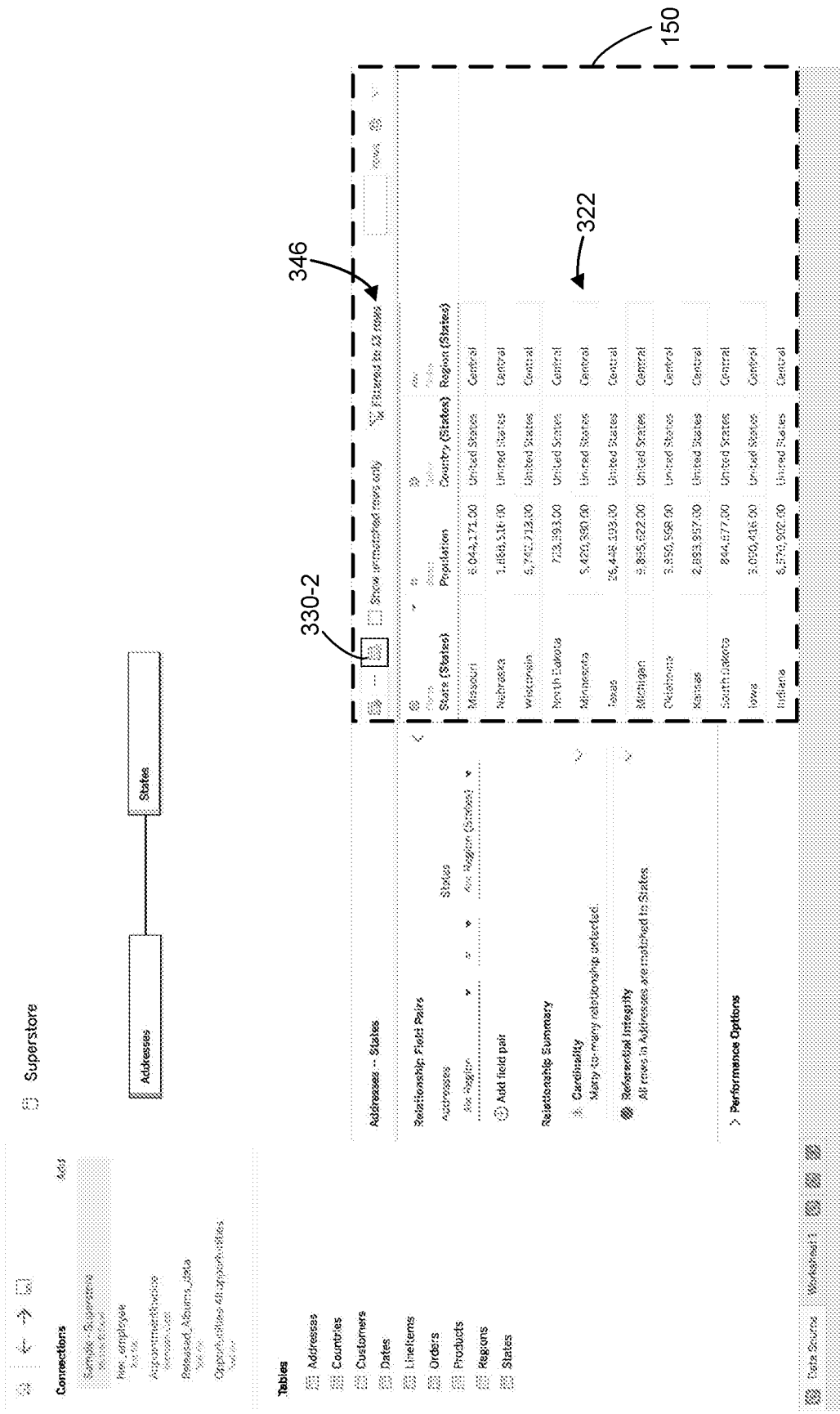
Figure 3K:
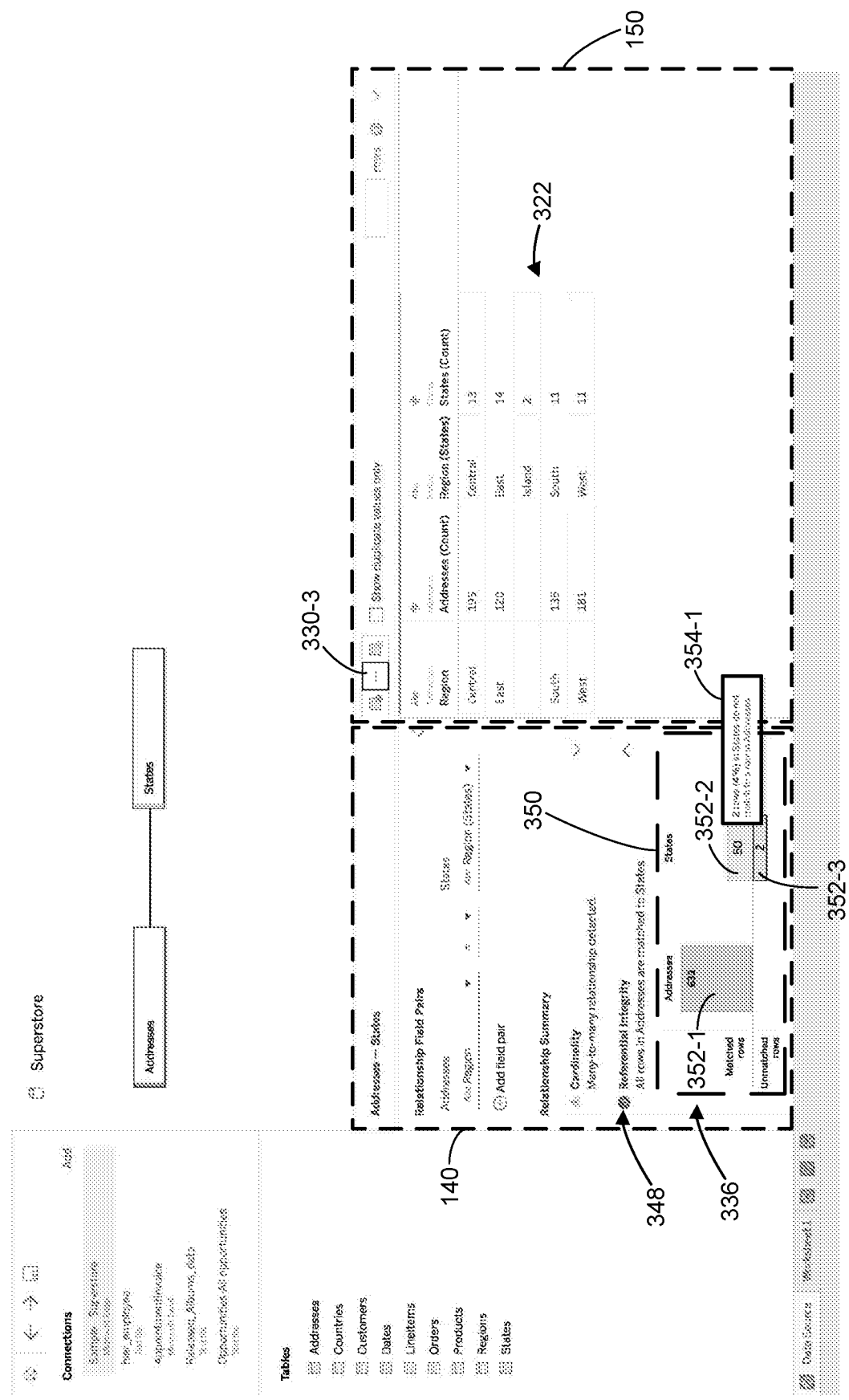
Figure 3L:
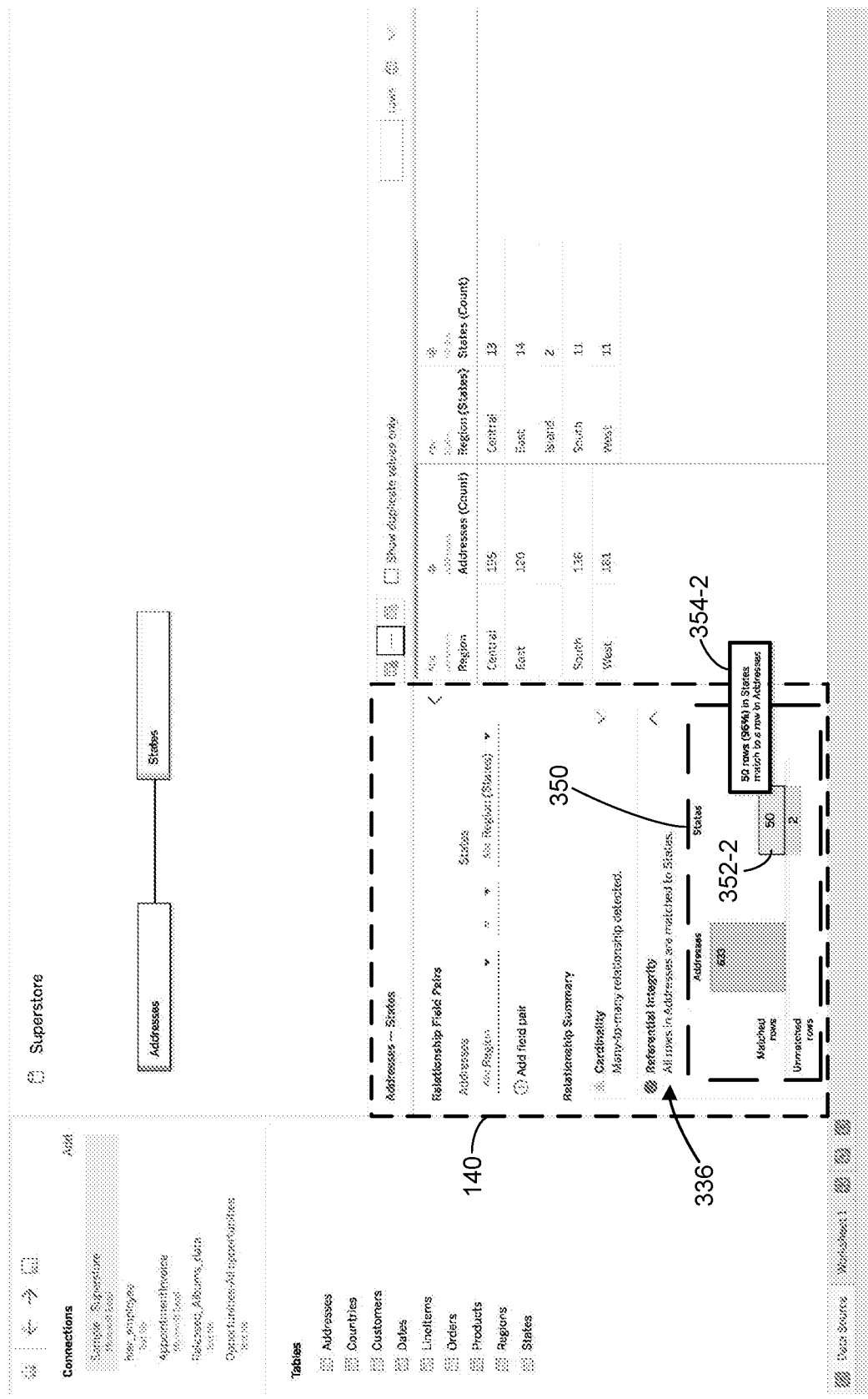
Figure 3M:
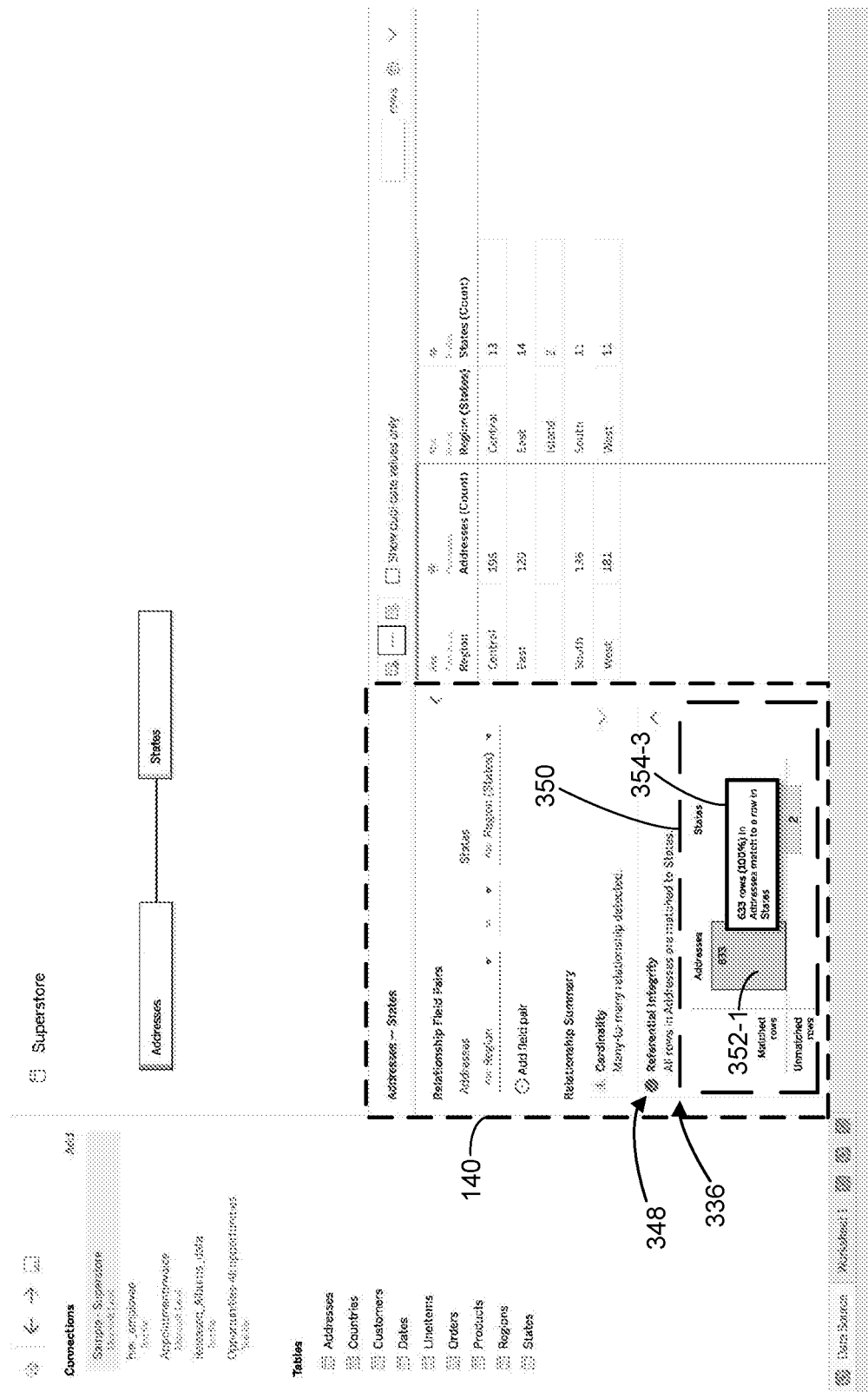
Figure 3N:
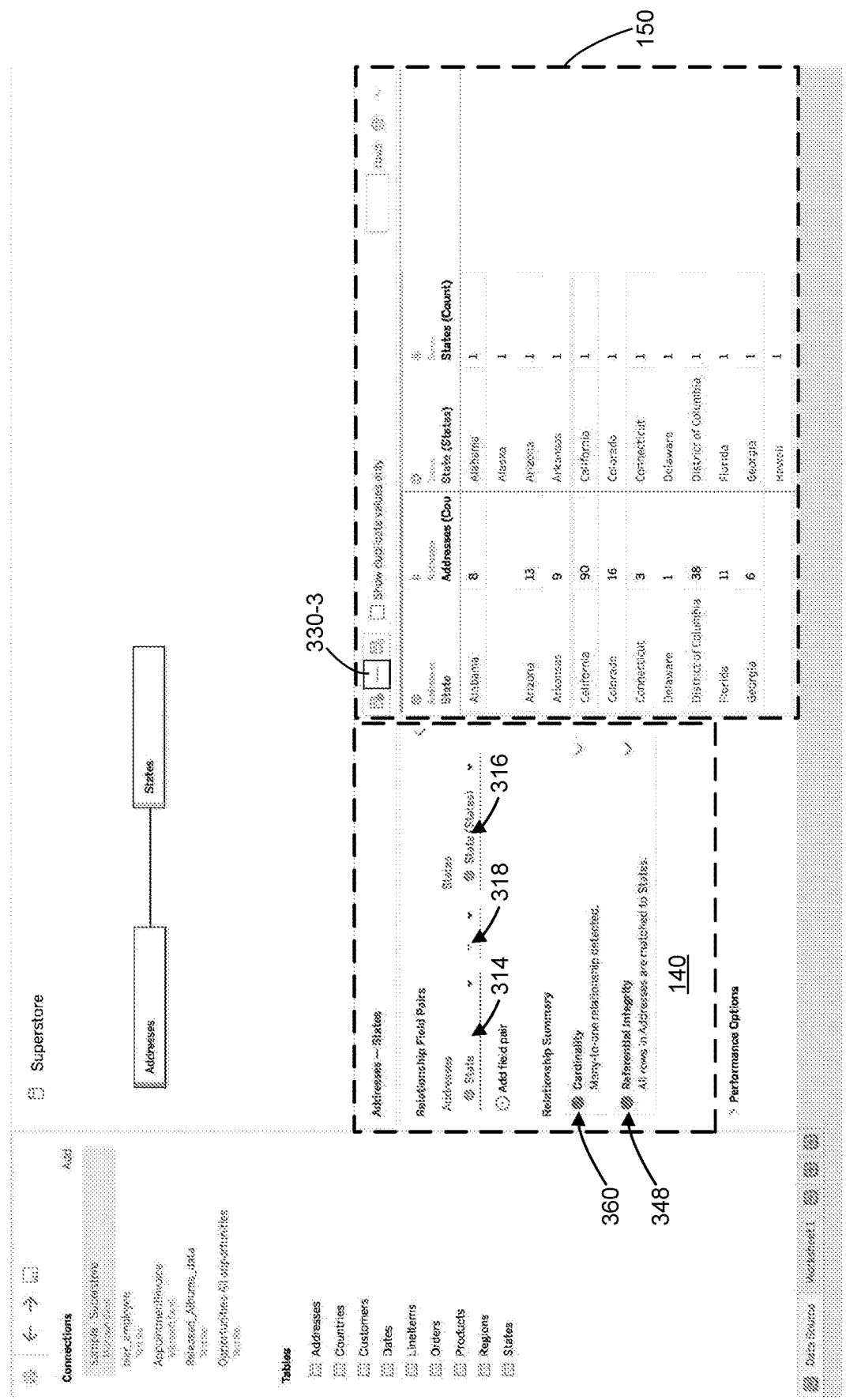
Figure 4A:
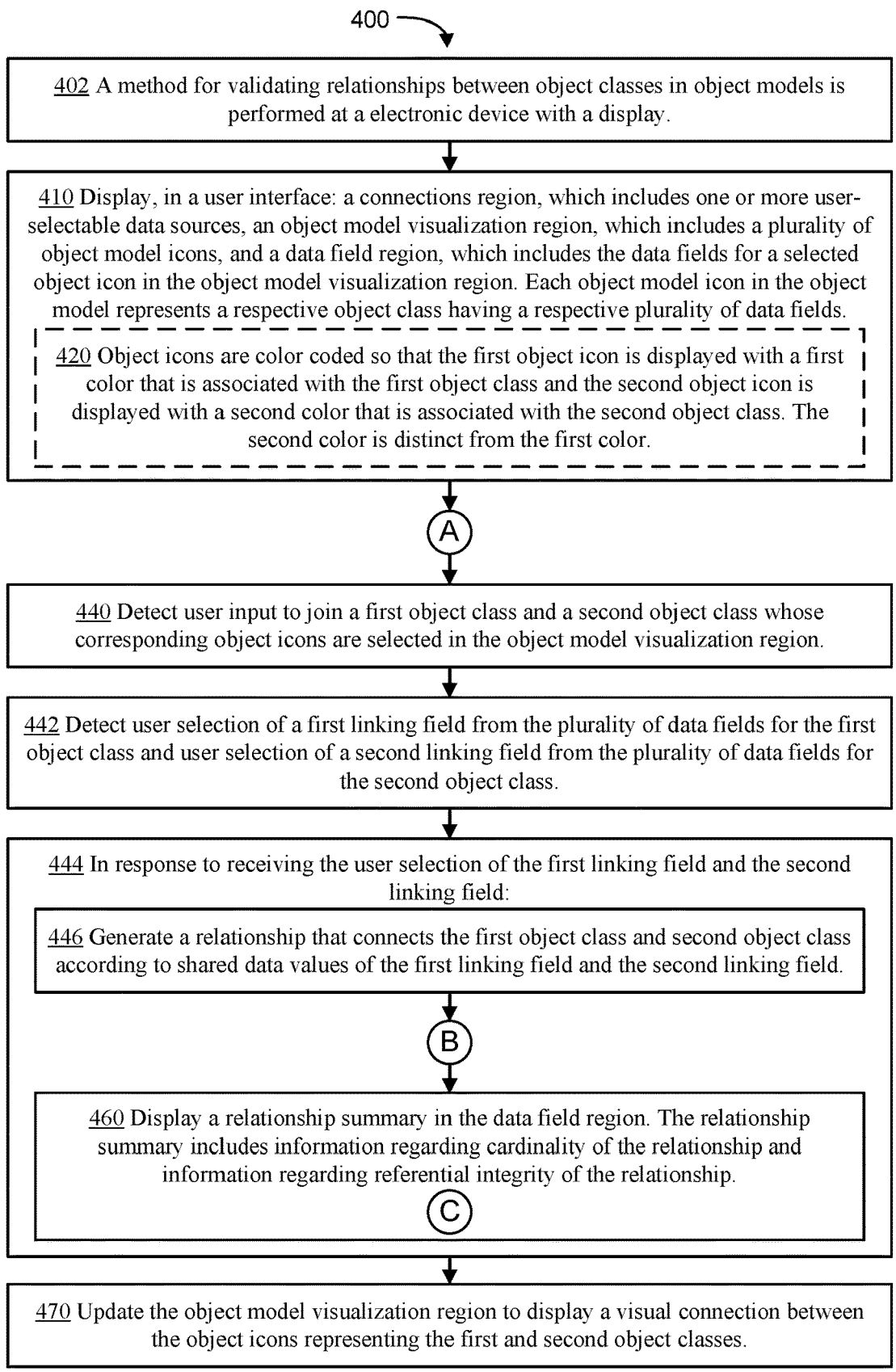
FIGS. 4A-4D provide a flowchart of a method for validating relationships between object classes in object models, in accordance with some implementations.
Figure 4B:
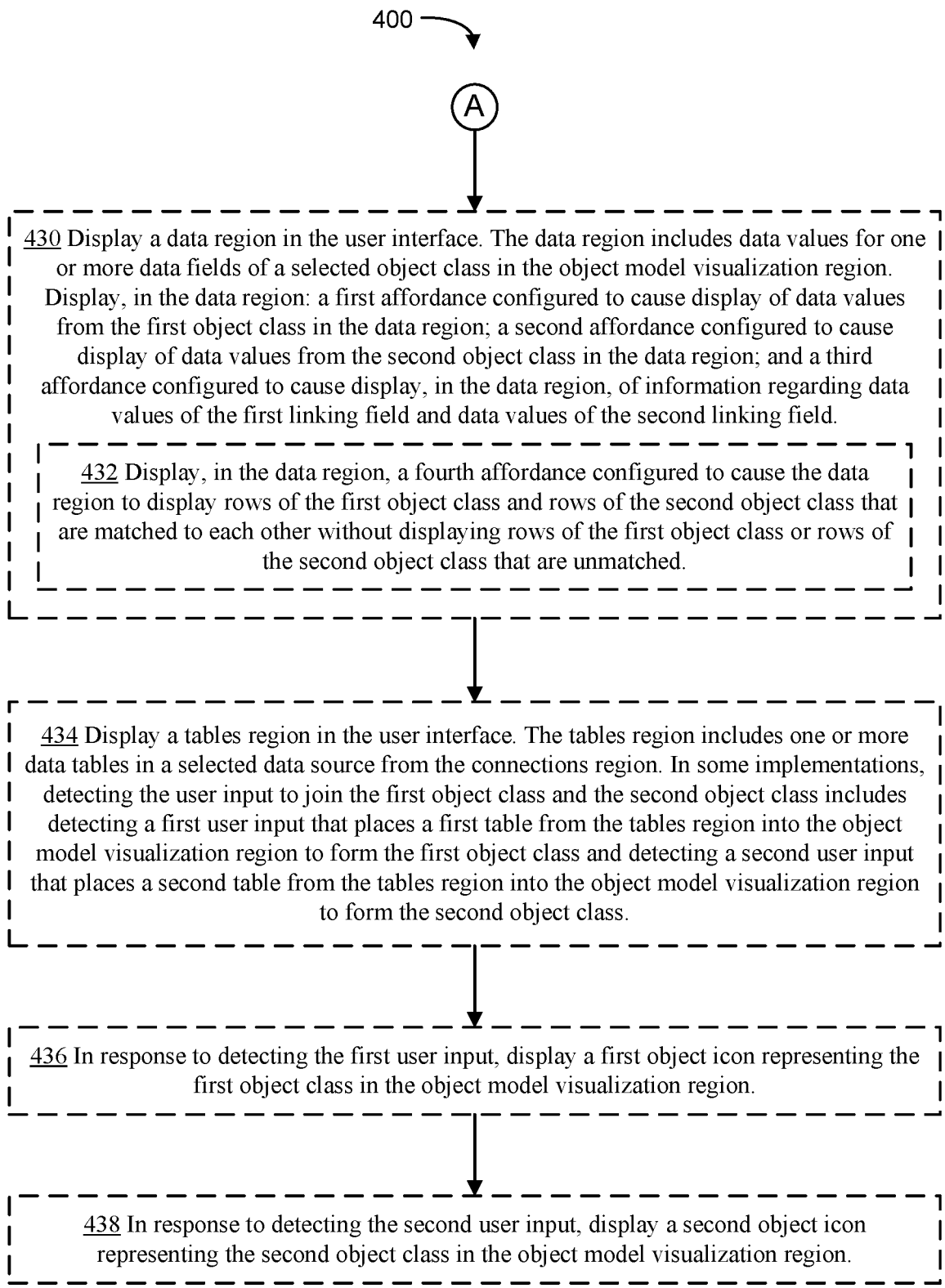
Figure 4C:
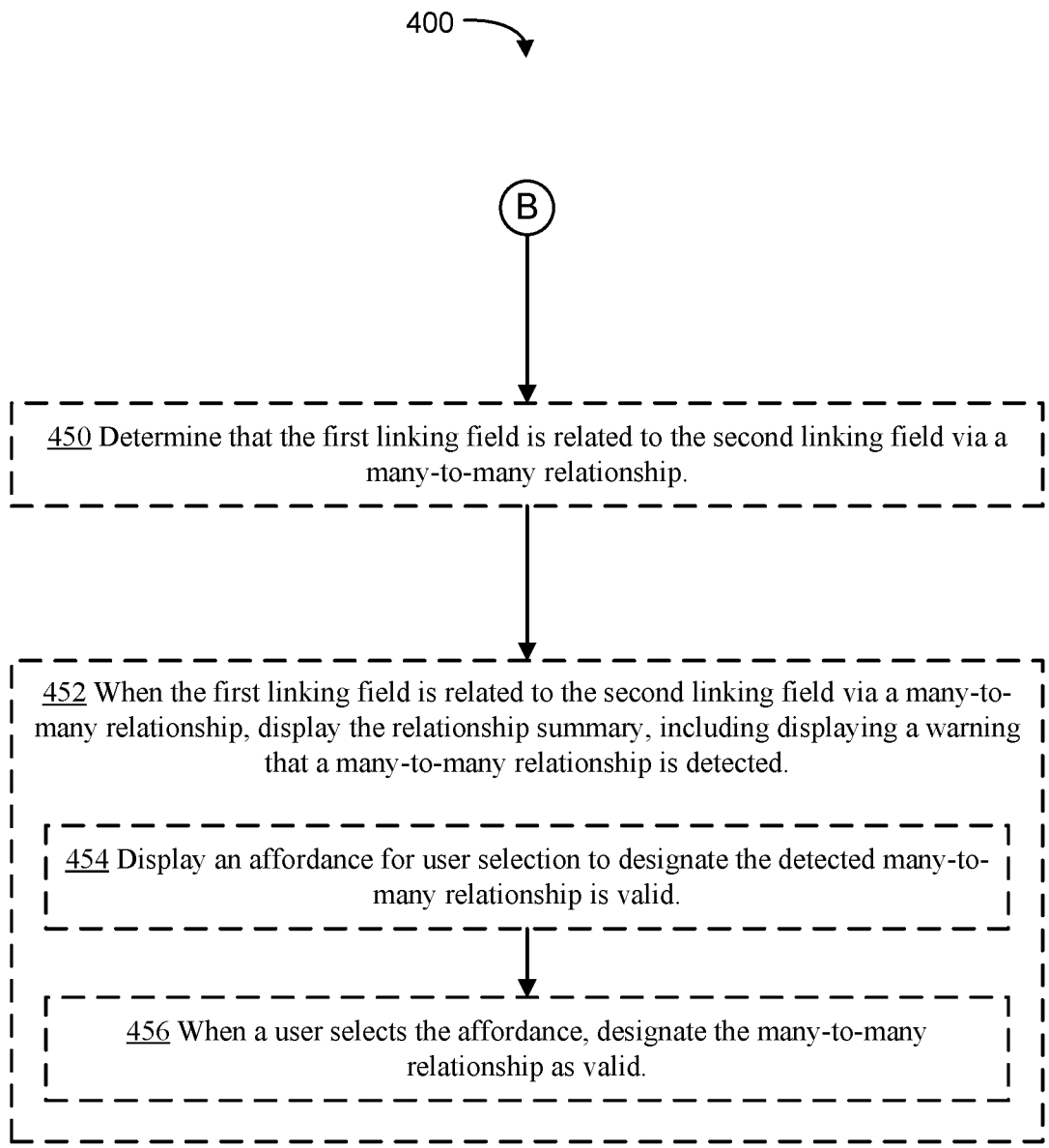
Figure 4D:
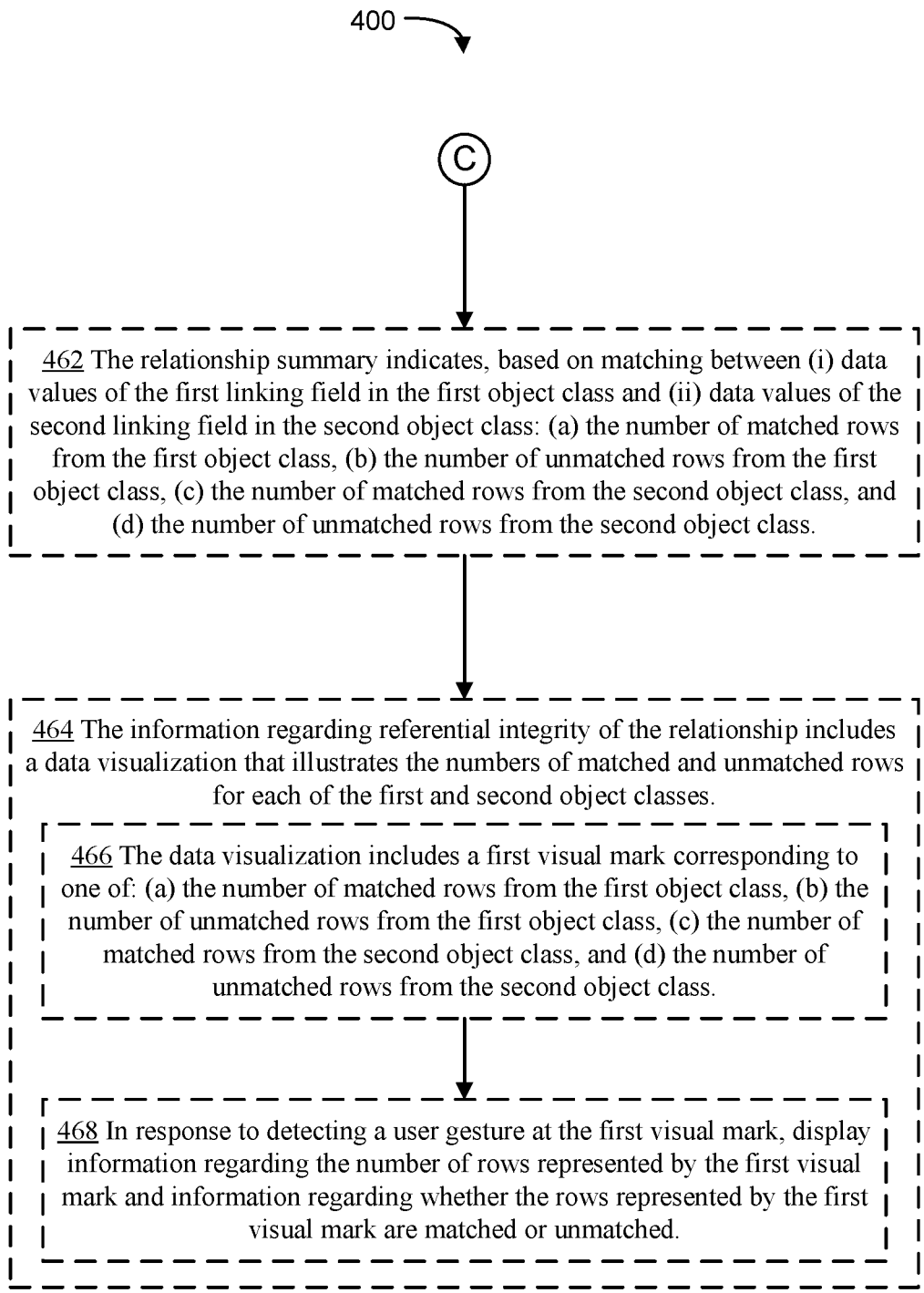

FIGS. 3A-3N are screen shots illustrating various features for building object models according to some disclosed implementations.

FIG. 3A shows a user interface 100 that includes a connections region 110, a tables region 120, an object model visualization region 130, a data fields region 140, and a data region 150, all of which are displayed simultaneously.

The connections region 110 includes one or more user-selectable data sources 112. In this example, the connections region 110 displays five different data sources, and in response to detecting a user selection of the "Sample—Superstore" data source, the name 114 of the selected data source "Superstore" is displayed in the user interface 100.

The tables region 120 includes one or more data tables 122 from a data source 112 that is selected in the connections region 110. In this example, the "Sample—Superstore" data source is selected in the connections region 110 and the tables region 120 displays nine data tables 122 that are from the "Sample—Superstore" data source.

The object model visualization region 130 displays an object model 132. In this example, the object model 132 currently includes a first object class, represented in the object model visualization region 130 as a first object icon 134-1. The first object icon 134-1 includes the name of the first object class, which in this example is "Addresses," and a first color, which in this example is blue, and is associated with the "Addresses" object class. The first color is also used throughout the entire user interface 100 to provide an indication that information displayed in association with the first color corresponds to the first object class (and the first object icon 134-1). For example, the data fields and data values displayed in the data region 150 are displayed in association with the first color to indicate that the displayed data fields and data values are from the "Addresses" object class.

An object class can be generated from a data table, a subset (less than all) of the information from a data table (such as a subset of columns or a subset of rows), or a combination (e.g., join or union) of two or more tables. In this example, the "Addresses" object class, which is represented in the object model visualization region 130 by the first object icon 134-1, is generated from a first data table 122-1 "Addresses," as shown in the tables region 120.

The data field region 140 includes information regarding the data fields for object classes that are represented in the object model visualization region 130 as object icons 134. In this example, the object model 132 includes one object class, the "Addresses" object class, so the data field region 140 displays the name 311 of the object class and information regarding the data fields 310 in the object class (e.g., data types, field names, and remote field names). The data field region 140 also displays an indication 146 that the information displayed in the data field region 140 is from the "Addresses" object class, which includes 6 data fields (e.g., columns) and 633 rows. The data fields 310 are also displayed with the first color to indicate that the displayed data fields 310 are from the "Addresses" object class.

The data region 150 includes rows of data from the "Addresses" object class. In this example, the object model visualization region 130 displays one object icon 134-1 corresponding to the "Addresses" object class, and the data region 150 displays a table that includes data fields and data values from the "Addresses" object class.

FIG. 3B illustrates a user input 312 to join a first object class and a second object class to one another. The first object class "Addresses" is represented by the first object icon 134-1. The user input 312 may be a drag and drop gesture, a right click, a click, or a double click on a data table 122 in the tables region 120. In this example, the user input 312 is a drag and drop gesture that includes selection of a second data table 122-2 (e.g., "States" data table) in the tables region 120, and placement of the second data table 122-2 in the object model visualization region 130. In response to receiving the user input 312 to join the first object class, represented by the "Addresses" object icon 134-1 to the second object class, the user interface 100 is updated as shown in FIG. 3C.

As shown in FIG. 3C, the object model visualization region 130 is updated to include a second object icon 134-2, which represents the second object class "States." The second object icon 134-2 includes the name of the second object class, which in this example is "States," and uses a second color that is associated with the "States" object class. The second color is distinct from the first color, and in this example, the second color is yellow. The second color is used throughout the entire user interface 100 to provide an indication that information displayed in association with the second color corresponds to the second object class (and the second object icon 134-2).

In response to receiving the user input 312, the data visualization application 222 (or data visualization web application 270) determines that the user intends to join (e.g., connect) the "Addresses" object class to the "State" object class and define a relationship between the two object classes.

The data field region 140 is updated in response to receiving the user input 312 and in accordance with the determination that a user intends to join the "Addresses" object class to the "State" object class. The data field region 140 displays a first linking field affordance 314, which allows a user to select a first linking field, a second linking field affordance 316, which allows a user to select a second linking field, and a third affordance 318, which allows a user to select a relationship between the first linking field and the second linking field. The first object class "Addresses" has a first plurality of data fields, and the first linking field affordance 314 allows the user to select the first linking field from the first plurality of data fields. Similarly, the second object class "States" has a second plurality of data fields, and the second linking field affordance 316 allows the user to select the second linking field from the second plurality of data fields. When the relationship is "=", as shown in this example, a relationship that connects the first and second object classes is generated according to shared data values of the first linking field and the second linking field. In some implementations, the data visualization application 222 (or data visualization web application 270) automatically selects at least one of the first linking field and the second linking field. In some implementations, the data visualization application 222 (or data visualization web application 270) provides a suggestion or recommendation for the first linking field and the second linking field. In some implementations, at least one of the first linking field and the second linking field is selected by a user.

The data field region 140 also displays an affordance 320 for adding a new field pair, which is used when the two class objects are linked by a combination of two or more linking fields from each of the class objects. The indication 146, displayed in the data field region 140, is also updated to display "Addresses—States" to indicate that the information displayed in the data field region corresponds to a relationship between the "Addresses" object class and the "States" object class.

FIGS. 3D-3F illustrates three different switchable views within the data region 150 in accordance with some implementations. The data region 150 includes three affordances 330-1, 330-2, and 330-3, which toggle between the three switchable views based on which affordance is selected. The first affordance 330-1, when selected, causes display of data values from the first object class (e.g., the "Addresses" object class represented by the first object icon 134-1) in the data region 150. The second affordance 330-2, when selected, causes display of data values from the second object class (e.g., the "States" object class represented by the first object icon 134-1) in the data region 150. The third affordance 330-3, when selected, causes display, in the data region 150, information regarding data values of the first linking field and data values of the second linking field. In some implementations, the first affordance 330-1 uses the first color and the second affordance 330-2 uses the second color so that a user can readily identify the function of these affordances. In some implementations, the third affordance 330-3 includes an icon (in this example, a solid line) so that a user can easily understand that selection of the third affordance 330-3 will cause display of information regarding the relationship between the first and second object classes.

As shown in FIG. 3D, in response to user selection of the first affordance 330-1, the data region 150 displays a data table 322 that includes data fields and data values from the "Addresses" object class (represented by the first object icon 134-1 in the object model visualization region 130). The data table 322 includes the data fields (e.g., columns) and data values (e.g., rows) from the first object class and at least a sample or a subset (less than all) of the data fields and/or data values from the first object class is displayed in the data region 150. The first color (e.g., blue) is used to indicate that the data fields and data values currently displayed in the data region 150 are from the first object class.

As shown in FIG. 3E, in response to user selection of the second affordance 330-2, the data region 150 displays a data table 322 that includes data fields and data values from the "States" object class (represented by the second object icon 134-2 in the object model visualization region 130). The data table 322 includes the data fields (e.g., columns) and data values (e.g., rows) from the second object class and at least a sample or a subset (less than all) of the data fields and/or data values from the second object class is displayed in the data region 150. The second color (e.g., yellow) is used to indicate that the data fields and data values currently displayed in the data region 150 are from the second object class.

FIG. 3F shows that the user has selected, from the first plurality of data fields, the data field "Region" 396 as the first linking field. The user has also selected, from the second plurality of data fields, the data field "Region(States)" 398 as the second linking field. In response to detecting that the first linking field and the second linking field have been selected (e.g., by a user), the data field region 140 displays a relationship summary 142, which includes a first portion 334 that displays information regarding the cardinality of the relationship and a second portion 336 that displays information regarding the referential integrity of the relationship. The cardinality of the relationship is determined based on whether or not a many-to-many relationship is detected, and the referential integrity of the relationship determined based on matching between data values of the first linking field and data values of the second linking field.

In some implementations, the first portion 334 includes an affordance that, when selected by a user, causes the first portion 334 to expand and display additional information regarding the cardinality of the relationship. In some implementations, the second portion 336 includes an affordance that, when selected by a user, causes the second portion 336 to expand and display additional information regarding the referential integrity of the relationship. The first portion 334 and the second portion 336 of the data field region 140 are shown in a collapsed view in FIG. 3F.

In response to user selection of the third affordance 330-3, the data region 150 displays a data table 322 that includes data values from the first linking field, "Region" (associated with the first object class "Addresses"), and data values from the second linking field, "Region(States)," (associated with the second object class "States"). In some implementations, since the data values from the first linking field" and data values from the second linking field are concurrently shown in the data region 150, the columns of data table 322 are color coded based on which object class the data field and data values shown in the column belong to. The first color is used to indicate which columns in the data table 322 are from the first object class, and the second color is used to indicate which columns in the data table 322 are from the second object class. In this example, the leftmost column and second column from the left are displayed with the first color to indicate that the data values in those two columns are from the first object class "Addresses," and the rightmost column and second column from the right are displayed with the second color to indicate that the data values in those two columns are from the second object class "States."

In some implementations, the data table 322 includes a first set of one or more columns from the first object class and a second set of one or more columns from the second object class. In some implementations, the data table 322 includes a single row for each unique data value in the first linking field and displays, for each unique data value, the number of times the unique data value appears in the first linking field. For example, the data table shows that the data value "Central" occurs in 195 rows of the first object class "Addresses." In some implementations, the data table 322 includes unique data values in the second linking field and displays, for each unique data value, the number of times the unique data value appears in the second linking field. For example, the data table shows that the data value "Central" occurs in 13 rows of the second object class "States." In some implementations, a first data value in the first linking field is displayed in the same row as a second data value in the second linking field that has a same value as the first data value. For example, the data value "Central" for both the "Region" data field from the first object class and the "Region (States)" data field from the second object class appear on a same row. This allows a user to quickly see that the "Central" data value is included in both object classes. A user can also see that there are multiple instances of "Central" in both of the object classes, so selection of "Region" to join these object classes is probably not the best.

The data value "Island" from the "Region (States)" data field in the second object class appears on a row that does not include any corresponding data values under the "Region" field of the first object class, indicating that the first object class does not have an "Island" data value in the "Region" data field.

In FIG. 3G, the first portion 334 of the data field region 140 is shown in an expanded view. In this example, the data visualization application 222 (or data visualization web application 270) determines that the first linking field is related to the second linking field via a many-to-many relationship. In response, the user interface 100 displays, in the data field region 140, a warning 340 that a many-to-many relationship is detected. The data field region 140 also displays an affordance 344 that when selected by the user, designates the detected many-to-many relationship as valid (e.g., validates the detected many-to-many relationship). The data field region 140 also displays an affordance 342 that when selected, causes the data region 150 to display duplicate data values (i.e., data values of the linking fields that are many-to-many), thereby providing users with information that may help troubleshooting in the case where the many-to-many-relationship is unexpected or undesired by the user. In response to detecting a user input at the affordance 342, the data region 150 is updated to display information regarding data values that are included in both linking fields without displaying information regarding data values that are not included in both linking fields, as shown in FIG. 3H.

In addition to user selection of the affordance 342, the data region 150 can also be triggered to display information regarding data values that are included in both linking fields without displaying information regarding data values that are not included in both linking fields in response to user selection of a fourth affordance 330-4 displayed in the data region 150. As shown in FIG. 3H, the data table 322 shown in the data region 150 includes information regarding data values, "Central," "East," "South," and "West" from both the first object class "Addresses" and the second object class "States." Compared to the data table 322 shown in FIG. 3G, the data table 322 own in FIG. 3H does not include information regarding the "Island" data value, which is included in the second linking field but not the first linking field.

FIG. 3I illustrates a user input 349 at the data table 322. As shown, the user input 349 is detected at either the "Central" data value under the "Region(States)" column or the "13" data value. In response to detecting the user input 349, the data table 322 is updated to display rows from the "States" object class that correspond to the "Central" data value, as shown in FIG. 3J. The data region 150 also displays an indication 346 that the data table 322 is currently displaying a subset of all data values from the "States" object class, and more specifically, that only the 13 rows from the "States" object class that correspond to the "Central" region are displayed in the data table 322. The data region 150 is also updated to highlight the second affordance 330-2 to further indicate that the data values and data fields displayed in the data table 322 are from the second object class "States."

In FIG. 3K, the data region 150 displays the third affordance 330-3 highlighted to indicate that a user input at the third affordance 330-3 has been detected. In response to detection of user input at the third affordance 330-3, the data table 332 is updated to display information regarding data values from both the first linking field and the second linking field.

Referring to the data field region 140 shown in FIG. 3K, the second portion 336 of the data field region 140 is shown in an expanded view. The referential integrity of the relationship is determined based on matching between (i) data values of the first linking field in the first object class and (ii) data values of the second linking field in the second object class. Displaying information regarding the referential integrity of the relationship includes displaying information regarding: (a) the number of matched rows from the first object class, (b) the number of unmatched rows from the first object class, (c) the number of matched rows from the second object class, and (d) the number of unmatched rows from the second object class.

The data field region 140 also displays, in the second portion 336, a data visualization 350, which illustrates the numbers of matched and unmatched rows for each of the first object class "Addresses" and second object class "States." The data visualization 350 includes one or more visual marks that provide a visual representation of information regarding the number of matched rows and the number of unmatched rows between the first and second linking fields.

In this example, the data visualization 350 includes a visual mark 352-1 that represents the number of matched rows (e.g., matched data values) in the "Addresses" object class (e.g., 633 rows), a visual mark 352-2 that represents the number of matched rows (e.g., matched data values) in the "States" object class (e.g., 50 rows), and a visual mark 352-3 that represents the number of unmatched rows (e.g., unmatched data values) in the "States" object class (e.g., 2 rows). In this example, the data visualization does not include a visual mark corresponding to the number of unmatched rows (e.g., unmatched data values) in the "Addresses" object class because the "Addresses" object class does not include any unmatched rows.

In response to detecting a user gesture (e.g., user hover or a user selection or input, such as a click, double click, or right click) at the visual mark 352-3, the user interface displays a window 354-1 (e.g., pop-up window), which provides detailed information regarding the visual mark 352-3. In particular, the window 354-1 displays the comment "2 rows (4%) in States do not match to a row in Addresses."

As shown in FIG. 3L, in response to detecting a user gesture at the visual mark 352-2, the user interface displays a window 354-2 (e.g., pop-up window), which provides detailed information regarding the visual mark 352-2. In particular, the window 354-2 displays the comment "50 rows (96%) in States match to a row in Addresses."

As shown in FIG. 3M, in response to detecting a user gesture at the visual mark 352-1, the user interface displays a window 354-3 (e.g., pop-up window), which provides detailed information regarding the visual mark 352-1. In particular, the window 354-3 displays the comment "633 rows (100%) in Addresses match to a row in States."

In this example, the data visualization application 222 (or data visualization web application 270) determines that there are no issues with the referential integrity of the relationship. The data field region 140 displays an indication 348 that no issues were detected with regards to the referential integrity of the relationship and displays the phrase, "All rows in Addresses are matched to States."

Referring to FIG. 3N, a user has selected, at the first linking field affordance 314, a new data field, "States," from the first plurality of data fields from the "Addresses" object class to be the first linking field. The user has also selected, at the second linking field affordance 316, a new data field, "States (States)," from the second plurality of data fields from the "States" object class to be the second linking field. In response to detecting the user selection of the new first linking field and the new second linking field, the data region 150 is automatically updated to display information regarding the new first linking field, "State," and the new second linking field, "State (States)". As shown in the data region 150, the third affordance 330-3 is selected, indicating that information shown in the data region corresponds to both the new first linking field and the new second linking field. The data table 332 displays information regarding data values in the new first linking field and the new second linking field, and the columns of the data table 322 are color-coded to clearly indicate to which object class the data values in each of the columns correspond.

In this example, the data visualization application 222 (or data visualization web application 270) determines that there are no issues with the cardinality of the relationship and that there are no issues with the referential integrity of the relationship. The data field region 140 provides an indication 360 that no issues were detected with regards to the cardinality of the relationship and displays the phrase, "Many-to-one relationship detected." The data field region 140 also displays an indication 348 that no issues were detected with regards to the referential integrity of the relationship and displays the phrase, "All rows in Addresses are matched to States."

FIGS. 4A-4D provide a flowchart of a method 400 for validating relationships between object classes in object models, in accordance with some implementations. The method 400 is performed (402) at a computing device (e.g., a computing device 200 or a computing device that is part of a server system 290) with a display. The computing device includes one or more processors and memory, and the memory stores one or more programs configured for execution by the one or more processors.

The computer displays (410), in a user interface 100: a connections region 110, which includes one or more user-selectable data sources 112, an object model visualization region 130, which includes a plurality of object model icons 134, and a data field region 140, which includes the data fields for a selected object icon 134 in the object model visualization region 130. Each object model icon 134 in the object model represents a respective object class having a respective plurality of data fields. For example, as shown in FIG. 3A, the "Addresses" object class (represented by the first object icon 134-1 and the first color, blue) includes a first plurality of data fields "Address ID," "Country," "City," "Postal Code," "Region," and "State". In another example, as shown in FIG. 3E, the "States" object class (represented by the second object icon 134-2 and the second color, yellow) includes a second plurality of data fields "State," "Population," "Country," and "Region".

The computer detects (440) user input to join a first object class and a second object class whose corresponding object icons 134-1 and 134-2 are selected in the object model visualization region. The computer also detects (442) user selection of a first linking field from the plurality of data fields for the first object class and user selection of a second linking field from the plurality of data fields for the second object class. For example, as shown in FIG. 3F, a user may select a first linking field, "Region" at the first linking field affordance 314 and a second linking field "Region (States)" at the second linking field affordance 316. The first linking field is selected from the first plurality of data fields and the second linking field is selected from the second plurality of data fields. In response (444) to receiving the user selection of the first linking field and the second linking field, the computer generates (446) a relationship that connects the first object and second object according to shared data values of the first linking field and the second linking field and displays (460) a relationship summary 142 in the data field region 140. The relationship summary 142 includes information regarding cardinality of the relationship and information regarding referential integrity of the relationship.

The computer updates (470) the object model visualization region 130 to display a visual connection 135 (e.g., a solid line) between the object icons 134-1 and 134-2 representing the first object class and the second object class.

In some implementations, the object icons are color coded (420) so that the first object icon 134-1 is displayed with a first color (e.g., blue) that is associated with the first object class and the second object icon 134-2 is displayed with a second color (e.g., yellow) that is associated with the second object class. The second color is distinct (e.g., different, discernable) from the first color.

In some implementations, the computer displays (430) a data region 150 in the user interface 100. The data region 150 includes data values for one or more data fields of a selected object class in the object model visualization region 130. The computer also displays (430), in the data region 150: a first affordance 330-1, a second affordance 330-2, and a third affordance 330-3. The first affordance 330-1, when selected, is configured to cause display of data values from the first object in the data region 150. The second affordance 330-2, when selected, is configured to cause display of data values from the second object in the data region 150. The third affordance 330-3, when selected, is configured to cause display, in the data region 150, of information regarding data values of the first linking field and data values of the second linking field. An example of the different information shown in the data region 150 in response to user selection of the first affordance 330-1, the second affordance 330-2, and the third affordance 330-3 is shown in FIGS. 3D, 3E, and 3F, respectively.

In some implementations, the computer also displays (432), in the data region 150, a fourth affordance 330-4, configured to cause the data region 150 to display rows of the first object class and rows of the second object class that are matched to each other without displaying rows of the first object class or rows of the second object class that are unmatched. An example of the information shown in the data region 150 when the fourth affordance 220-4 is selected is shown with respect to FIG. 3H. The information in the data region 150 shown in FIG. 3H (when the fourth affordance 330-4 is selected) can be compared to the information in the data region 150 shown in FIG. 3G (when the fourth affordance 330-4 is not selected).

In some implementations, the computer also displays (434) a tables region 120 in the user interface. The tables region 120 includes one or more data tables 122 in a selected data source 112 from the connections region 110. In some implementations, detecting the user input to join the first object class and the second object class includes detecting a first user input (e.g., drag and drop) that places a first table 122-1 from the tables region 120 into the object model visualization region 130 to form the first object class and detecting a second user input 312 (e.g., drag and drop) that places a second table 122-2 from the tables region 120 into the object model visualization region 130 to form the second object class. An example of the user input to join the first object class and the second object class is shown with respect to FIGS. 3A and 3B. In response to detecting the first user input, the computer displays (436) a first object icon 134-1 representing the first object class in the object model visualization region 130, an example of which is provided in FIG. 3A. In response to detecting the second user input 312, the computer displays (438) a second object icon 134-2 representing the second object class in the object model visualization region 130, an example of which is provided in FIGS. 3B and 3C.

In some implementations, the computer determines (450) that the first linking field is related to the second linking field via a many-to-many relationship. When the first linking field is related to the second linking field via a many-to-many relationship, the computer displays (452) the relationship summary 412, including displaying a warning 340 that a many-to-many relationship is detected. FIGS. 3G and 3H illustrate examples of the warning 340 that a many-to-many relationship is detected. In some implementations, in response to the determination that the first linking field is related to the second linking field via a many-to-many relationship, the computer displays (454) an affordance 344 for user selection to designate the detected many-to-many relationship as valid. When a user select the affordance 344, the computer designates (456) the many-to-many relationship as valid (e.g., validates the many-to-many relationship).

In some implementations, the relationship summary 412 indicates (462), based on matching between (i) data values of the first linking field in the first object class and (ii) data values of the second linking field in the second object class: (a) the number of matched rows from the first object class, (b) the number of unmatched rows from the first object class, (c) the number of matched rows from the second object class, and (d) the number of unmatched rows from the second object class.

In some implementations, the information regarding referential integrity of the relationship includes (464) a data visualization 350 that illustrates the numbers of matched and unmatched rows for each of the first and second object classes In some implementations, the data visualization 350 includes (466) a first visual mark corresponding to one of: (a) the number of matched rows from the first object class, (b) the number of unmatched rows from the first object class, (c) the number of matched rows from the second object class, and (d) the number of unmatched rows from the second object class.

In some implementations, in response to detecting a user gesture at the first visual mark, the computer displays (468) information regarding the number of rows represented by the first visual mark and information regarding whether the rows represented by the first visual mark are matched or unmatched. FIGS. 3K-3M illustrate examples of the data visualization 350 shown in the data field region 140.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of validating relationships between object classes in object models, the method comprising:
at an electronic device with a display:
detecting user input to join a first object class and a second object class corresponding to user-selected object icons;
detecting user selection of a first linking field from a plurality of data fields for the first object class and user selection of a second linking field from a plurality of data fields for the second object class; and
in response to receiving the user selection of the first linking field and the second linking field:
generating a relationship that connects the first object class and the second object class according to shared data values of the first linking field and the second linking field;
displaying a relationship summary, including information regarding cardinality of the relationship and information regarding referential integrity of the relationship; and
displaying a visual connection between the user-selected object icons representing the first and second object classes.

2. The method of claim 1, further comprising:
determining that the first linking field is related to the second linking field via a many-to-many relationship; and
in response to the determination that the first linking field is related to the second linking field via a many-to-many relationship, displaying the relationship summary includes displaying a warning that a many-to-many relationship is detected.

3. The method of claim 2, further comprising:
in response to the determination that the first linking field is related to the second linking field via a many-to-many relationship, displaying the relationship summary includes displaying an affordance for user selection to designate the detected many-to-many relationship as valid; and
in accordance with detecting a user selection of the affordance, designating the many-to-many relationship as valid.

4. The method of claim 1, wherein, based on matching between (i) data values of the first linking field in the first object class and (ii) data values of the second linking field in the second object class, the relationship summary indicates:
(a) a number of matched rows from the first object class;
(b) a number of unmatched rows from the first object class;
(c) a number of matched rows from the second object class; and
(d) a number of unmatched rows from the second object class.

5. The method of claim 4, wherein the information regarding referential integrity of the relationship includes a data visualization that illustrates the numbers of matched and unmatched rows for each of the first and second object classes.

6. The method of claim 5, wherein
the data visualization includes a first visual mark corresponding to one of:
(a) a number of matched rows from the first object class;
(b) a number of unmatched rows from the first object class;
(c) a number of matched rows from the second object class; and
(d) a number of unmatched rows from the second object class; and
in response to detecting a user gesture at the first visual mark, displaying information regarding a number of rows represented by the first visual mark and information regarding whether the rows represented by the first visual mark are matched or unmatched.

7. The method of claim 1, further comprising:
displaying, in a user interface, a data region including data values for one or more data fields of a selected object class;
displaying, in a data region:
a first affordance configured to cause display of data values from the first object class in the data region;
a second affordance configured to cause display of data values from the second object class in the data region; and
a third affordance configured to cause display, in the data region, of information regarding data values of the first linking field and data values of the second linking field.

8. The method of claim 7, further comprising:
displaying, in the data region, a fourth affordance configured to cause the data region to display rows of the first object class and rows of the second object class that are matched to each other without displaying rows of the first object class or rows of the second object class that are unmatched.

9. The method of claim 1, further comprising:
displaying, in the user interface, a tables region including one or more data tables in a selected data source, wherein detecting the user input to join the first object class and the second object class includes detecting a first user input that places a first table from the tables region into an object model visualization region to form the first object class and detecting a second user input that places a second table from the tables region into the object model visualization region to form the second object class;
in response to detecting the first user input, displaying a first object icon representing the first object class in the object model visualization region; and
in response to detecting the second user input, displaying a second object icon representing the second object class in the object model visualization region.

10. The method of claim 1, wherein:
object icons are color coded so that a first object icon is displayed with a first color that is associated with the first object class and a second object icon is displayed with a second color that is associated with the second object class, the second color being distinct from the first color.

11. A computer system comprising:
a display;
one or more processors; and
memory, wherein the memory stores one or more programs configured for execution by the one or more processors, and the one or more programs comprise instructions for:

detecting user input to join a first object class and a second object class corresponding user-selected object icons;

detecting user selection of a first linking field from a plurality of data fields for the first object class and user selection of a second linking field from a plurality of data fields for the second object class; and in response to receiving the user selection of the first linking field and the second linking field:

generating a relationship that connects the first object class and the second object class according to shared data values of the first linking field and the second linking field;

displaying a relationship summary, including information regarding cardinality of the relationship and information regarding referential integrity of the relationship; and displaying a visual connection between the object icons representing the first and second object classes.

12. The computer system of claim 11, wherein the one or more programs further comprise instructions for:

determining that the first linking field is related to the second linking field via a many-to-many relationship; and in response to the determination that the first linking field is related to the second linking field via a many-to-many relationship, displaying the relationship summary includes displaying a warning that a many-to-many relationship is detected.

13. The computer system of claim 12, wherein the one or more programs further comprise instructions for:

in response to the determination that the first linking field is related to the second linking field via a many-to-many relationship, displaying the relationship summary includes displaying an affordance for user selection to designate the detected many-to-many relationship as valid; and in accordance with detecting a user selection of the affordance, designating the many-to-many relationship as valid.

14. The computer system of claim 11, wherein, based on matching between (i) data values of the first linking field in the first object class and (ii) data values of the second linking field in the second object class, the relationship summary indicates:

(a) a number of matched rows from the first object class;
(b) a number of unmatched rows from the first object class;
(c) a number of matched rows from the second object class; and
(d) a number of unmatched rows from the second object class.

15. The computer system of claim 14, wherein the information regarding referential integrity of the relationship includes a data visualization that illustrates the numbers of matched and unmatched rows for each of the first and second object classes.

16. A non-transitory computer readable storage medium storing one or more programs configured for execution by a computer system having a display, one or more processors, and memory, the one or more programs comprising instructions for:

detecting user input to join a first object class and a second object class corresponding to user-selected object icons;

detecting user selection of a first linking field from a plurality of data fields for the first object class and user selection of a second linking field from a plurality of data fields for the second object class; and in response to receiving the user selection of the first linking field and the second linking field:

generating a relationship that connects the first object class and the second object class according to shared data values of the first linking field and the second linking field;

displaying a relationship summary, including information regarding cardinality of the relationship and information regarding referential integrity of the relationship; and displaying a visual connection between the user-selected object icons representing the first and second object classes.

17. The storage medium of claim 16, wherein the one or more programs further comprise instructions for:

determining that the first linking field is related to the second linking field via a many-to-many relationship; and in response to the determination that the first linking field is related to the second linking field via a many-to-many relationship, displaying the relationship summary includes displaying a warning that a many-to-many relationship is detected.

18. The storage medium of claim 17, further comprising:

in response to the determination that the first linking field is related to the second linking field via a many-to-many relationship, displaying the relationship summary includes displaying an affordance for user selection to designate the detected many-to-many relationship as valid; and in accordance with detecting a user selection of the affordance, designating the many-to-many relationship as valid.

19. The storage medium of claim 16, wherein, based on matching between (i) data values of the first linking field in the first object class and (ii) data values of the second linking field in the second object class, the relationship summary indicates:

(a) a number of matched rows from the first object class;
(b) a number of unmatched rows from the first object class;
(c) a number of matched rows from the second object class; and
(d) a number of unmatched rows from the second object class.

20. The storage medium of claim 19, wherein the information regarding referential integrity of the relationship includes a data visualization that illustrates the numbers of matched and unmatched rows for each of the first and second object classes.

* * * * *